United States Patent
Woo

(10) Patent No.: US 11,791,482 B2
(45) Date of Patent: Oct. 17, 2023

(54) FUEL CELL SYSTEM AND CONDENSATE WATER STORAGE DEVICE

(71) Applicant: HYUNDAI MOBIS CO., LTD., Seoul (KR)

(72) Inventor: Myeong Nam Woo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 15 days.

(21) Appl. No.: 17/716,040

(22) Filed: Apr. 8, 2022

(65) Prior Publication Data
US 2022/0328852 A1    Oct. 13, 2022

(30) Foreign Application Priority Data

Apr. 8, 2021  (KR) .................. 10-2021-0045913
Apr. 20, 2021  (KR) .................. 10-2021-0051366

(51) Int. Cl.
*H01M 8/04119* (2016.01)
*H01M 8/04746* (2016.01)

(52) U.S. Cl.
CPC .... *H01M 8/04179* (2013.01); *H01M 8/04753* (2013.01); *H01M 8/04141* (2013.01); *H01M 2250/20* (2013.01)

(58) Field of Classification Search
CPC ......... H01M 8/04179; H01M 8/04753; H01M 8/04141; H01M 2250/20
See application file for complete search history.

(56) References Cited

U.S. PATENT DOCUMENTS

| | | | |
|---|---|---|---|
| 2002/0025460 A1* | 2/2002 | Horiguchi | H01M 8/04291 429/409 |
| 2015/0180058 A1* | 6/2015 | Kim | H01M 8/04164 429/414 |
| 2020/0075975 A1* | 3/2020 | Toyofuku | B08B 3/02 |
| 2021/0170910 A1* | 6/2021 | Sato | G01C 21/3469 |

FOREIGN PATENT DOCUMENTS

CN   202202379 U   *  4/2012

OTHER PUBLICATIONS

Li, CN 202202379U Espacenet machine translation, 2012 (Year: 2012).*

* cited by examiner

*Primary Examiner* — Adam A Arciero
(74) *Attorney, Agent, or Firm* — NSIP Law

(57) ABSTRACT

A condensate water storage device including a storage container defining a storage space to store condensate water, and having a discharge hole through which the condensate water is discharged to the outside, a valve unit to selectively open and close the discharge hole, a connection cable connected to the valve unit, and a winding unit connected to the connection cable to selectively wind the connection cable and manipulate an operation of the valve unit, thereby selectively discharging the condensate water, which is produced from a fuel cell.

20 Claims, 24 Drawing Sheets

FUEL CELL SYSTEM AND CONDENSATE WATER STORAGE DEVICE

CROSS-REFERENCE TO RELATED APPLICATION

This application claims priority to and the benefit of Korean Patent Application No. 10-2021-0045913 filed in the Korean Intellectual Property Office on Apr. 8, 2021, and Korean Patent Application No. 10-2021-0051366 filed in the Korean Intellectual Property Office on Apr. 20, 2021, the entire contents of which are incorporated herein by reference.

TECHNICAL FIELD

The present disclosure relates to a fuel cell system and a condensate water storage device, and more particularly, to a fuel cell system and a condensate water storage device, which are capable of selectively adjusting whether to discharge condensate water.

BACKGROUND ART

A fuel cell vehicle (e.g., a hydrogen fuel cell vehicle) is configured to autonomously generate electricity by means of a chemical reaction between fuel (hydrogen) and air (oxygen) and travel by operating a motor.

In general, the fuel cell vehicle may include a fuel cell stack configured to generate electricity by means of an oxidation-reduction reaction between hydrogen and oxygen, a fuel supply device configured to supply fuel (hydrogen) to the fuel cell stack, an air supply device configured to supply the fuel cell stack with air (oxygen) which is an oxidant required for an electrochemical reaction, and a thermal management system (TMS) configured to discharge heat, which is generated from the fuel cell stack and power electronic parts of the vehicle, to the outside of the system and control temperatures of the fuel cell stack and the power electronic parts.

Further, discharge water (condensate water) and exhaust gas (e.g., unreacted hydrogen), which are produced during the operation of the fuel cell stack, may be discharged to the outside through an exhaust pipe.

Meanwhile, various attempts have been made to apply the fuel cell system to construction machines (e.g., forklifts) as well as passenger vehicles (or commercial vehicles).

The main purpose of the passenger vehicle is to travel on the road, and condensate water, which is produced while the passenger vehicle travels (the fuel cell stack operates), may be discharged onto the road. The risk of an accident does not significantly increase even though the condensate water is discharged onto the road. Therefore, the passenger vehicle may freely discharge the condensate water onto the road without restriction on the discharge of condensate water.

In contrast, in the case of a construction machine used in an indoor workplace such as an interior of a factory or warehouse, condensate water, which is produced and discharged onto the floor of the workplace while the construction machine operates (a fuel cell stack operates), may contaminate the floor. Further, the condensate water discharged onto the floor may increase risks of various types of accidents (e.g., a slip-and-fall accident, an electric shock accident, etc.). Therefore, the condensate water, which is produced while the construction machine operates, needs to be discharged only to a predetermined particular location.

However, in the related art, there is a problem in that the condensate water, which is produced from the fuel cell stack while the construction machine operates, is discharged directly onto the floor of the workplace, which contaminates the floor and increases the risk of an accident.

Therefore, recently, various types of studies have been conducted to selectively adjust whether to discharge the condensate water produced while the fuel cell stack operates, but the study result is still insufficient. Accordingly, there is a need to develop a technology to selectively adjust whether to discharge the condensate water produced while the fuel cell stack operates.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present disclosure has been made in an effort to provide a fuel cell system and a condensate water storage device, which are capable of selectively adjusting whether to discharge condensate water.

In particular, the present disclosure has been made in an effort to selectively discharge condensate water, which is produced from the fuel cell stack, to a predetermined particular location.

The present disclosure has also been made in an effort to reduce the risks of contamination and accident caused by the discharge of condensate water.

The present disclosure has also been made in an effort to improve safety and reliability and create a comfortable working environment.

The objects to be achieved by the embodiments are not limited to the above-mentioned objects, but also include objects or effects that may be understood from the solutions or embodiments described below.

A first exemplary embodiment of the present disclosure provides a condensate water storage device including: a storage container defining a storage space configured to store condensate water, and having a discharge hole through which the condensate water is discharged to the outside; a valve unit configured to selectively open and close the discharge hole; a connection cable connected to the valve unit; and a winding unit connected to the connection cable and configured to selectively wind the connection cable and manipulate an operation of the valve unit.

This is to selectively discharge condensate water, which is produced from an object (e.g., a fuel cell stack), to a predetermined particular location.

That is, in the case of a construction machine used in an indoor workplace such as an interior of a factory or warehouse, condensate water, which is produced and discharged onto the floor of the workplace while the construction machine operates (a fuel cell stack operates), may contaminate the floor. Further, the condensate water discharged onto the floor may increase risks of various types of accidents (e.g., a slip-and-fall accident, an electric shock accident, etc.). Therefore, the condensate water, which is produced while the construction machine operates, needs to be discharged only to a predetermined particular location.

However, in the related art, there is a problem in that the condensate water, which is produced from the fuel cell stack while the construction machine operates, is discharged directly onto the floor of the workplace, which contaminates the floor and increases the risk of an accident.

In contrast, according to the first embodiment of the present disclosure, the condensate water, which is produced from the fuel cell stack, may be temporarily stored in the storage container and then discharged only to the predetermined particular location without being discharged directly onto the floor of the workplace. Therefore, it is possible to obtain an advantageous effect of inhibiting contamination caused by the condensate water and reducing risks of accidents (e.g., a slip-and-fall accident, an electric shock accident, etc.).

According to another example of the first exemplary embodiment of the present disclosure, the storage container may include a container main body having the storage space, and a container cover configured to cover the storage space.

According to the first exemplary embodiment of the present disclosure, the condensate water storage device may include: a locking groove provided in the container main body; a locking protrusion provided on the container cover and configured to be locked to the locking groove; and a cut-out slit provided in the container cover and disposed adjacent to the locking protrusion.

Since the container cover and the container main body are locked to each other by means of the locking grooves and the locking protrusions as described above, it is possible to obtain an advantageous effect of stably maintaining the state in which the container cover is coupled to the container main body. In addition, the cut-out slit may be provided at the periphery of the locking protrusion, which makes it possible to improve the dynamic properties of the locking protrusion relative to the container cover and make it easy to couple and separate the locking protrusion to and from the locking groove.

The valve unit may have various structures capable of selectively opening or closing the discharge hole.

For example, the valve unit may include: a valve member configured to be movable from a first position at which the valve member closes the discharge hole to a second position at which the valve member opens the discharge hole; and an elastic member configured to provide an elastic force to allow the valve member to move to the first position.

According to the first exemplary embodiment of the present disclosure, the valve member may include: a body portion connected to the storage container and configured to be rotatable from the first position to the second position; an opening/closing portion extending from one end of the body portion and configured to open and close the discharge hole; and a connection portion extending from the other end of the body portion and connected to the connection cable.

According to the first exemplary embodiment of the present disclosure, the condensate water storage device may include a hinge module configured to connect the body portion and the storage container so that the body portion is rotatable.

For example, the hinge module may include: a hinge shaft fixed to the storage container and configured to support the body portion so that the body portion is rotatable; a bushing interposed between the body portion and the hinge shaft; and a fastening member fastened to the hinge shaft and configured to lock the body portion to the hinge shaft.

According to the first exemplary embodiment of the present disclosure, the condensate water storage device may include: a guide slot provided in the valve member; and a guide protrusion disposed on the storage container, accommodated in the guide slot, and configured to be movable along the guide slot.

Since the guide protrusion moves along the guide slot as described above, it is possible to obtain an advantageous effect of minimizing vibration and swaying of the valve member and inhibiting the valve member from deviating from a predetermined movement route when the valve member rotates relative to the storage container.

According to the first exemplary embodiment of the present disclosure, the condensate water storage device may include: a first coupling portion disposed on the body portion and coupled to the elastic member; and a second coupling portion disposed on the connection portion and coupled to the connection cable.

Since the elastic member and the connection cable are respectively coupled to the first and second coupling portions respectively protruding from the lateral surfaces of the body and connection portions as described above, it is possible to obtain an advantageous effect of minimizing rotational interference between the elastic member and the connection cable and ensuring the smooth rotation of the valve member.

According to the first exemplary embodiment of the present disclosure, the condensate water storage device may include a valve sealing member interposed between the opening/closing portion and the discharge hole.

Since the gap between the opening/closing portion and the discharge hole is sealed by the valve sealing member as described above, it is possible to obtain an advantageous effect of minimizing a leak of the condensate water through the gap between the opening/closing portion and the discharge hole.

In particular, the condensate water storage device may include a support part configured to support the connection cable on the storage container.

Since the support part is provided as described above, it is possible to obtain an advantageous effect of inhibiting a tangle (twist) and separation of the connection cable and stably maintaining an arrangement state of the connection cable.

For example, the support part may include: a first support protrusion disposed on the storage container and configured to support the connection cable; and a second support protrusion disposed on the storage container, spaced apart from the first support protrusion, and configured to support the connection cable.

The winding unit may have various structures capable of selectively winding the connection cable.

For example, the winding unit may include: a housing mounted on the storage container and having an opening portion through which the connection cable enters or exits the housing; a cable drum rotatably disposed in the housing and configured to wind the connection cable; a driving part disposed in the housing and configured to provide driving power for rotating the cable drum; and a power transmission member configured to transmit the driving power of the driving part to the cable drum. When the connection cable is wound around the cable drum by a rotation of the cable drum, the connection cable may be pulled, and the valve member may move to the second position.

The cable drum may have various structures capable of winding the connection cable.

For example, the cable drum may include: a drum body rotatably disposed in the housing and configured to wind the connection cable; and a flange portion disposed at an end of the drum body and having a larger cross-sectional area than the drum body.

Since the flange portion is disposed at the end of the drum body as described above, it is possible to obtain an advantageous effect of inhibiting the connection cable from being abnormally wound around the drum body and inhibiting the connection cable wound around the drum body from separating from the drum body.

According to the first exemplary embodiment of the present disclosure, the condensate water storage device may include a bearing member disposed in the housing and configured to support the cable drum so that the cable drum is rotatable.

Since the cable drum is rotatably supported by the bearing member as described above, it is possible to obtain an advantageous effect of ensuring the smooth rotation of the cable drum relative to the housing and minimizing a loss of rotational force due to frictional resistance occurring when the cable drum rotates.

According to the first exemplary embodiment of the present disclosure, the condensate water storage device may include: an overflow hole provided in the container main body, and the condensate water may be discharged to the outside through the overflow hole when a water level of the condensate water exceeds a reference water level.

As described above, the overflow hole may be provided in the container main body, and the condensate water may be discharged to the outside through the overflow hole when an excessive amount of condensate water flows into the storage container. Therefore, it is possible to obtain an advantageous effect of inhibiting damage to the storage container due to the inflow of the excessive amount of condensate water into the storage container, thereby improving safety and reliability.

According to the first exemplary embodiment of the present disclosure, the condensate water storage device may include a level sensor disposed in the storage container and configured to measure a water level of the condensate water.

According to the first exemplary embodiment of the present disclosure, the condensate water storage device may include an alarm generation unit configured to generate an alarm signal when the detection result of the level sensor indicates that the water level of the condensate water exceeds a reference water level.

As described above, when the water level of the condensate water exceeds the preset reference water level, the alarm signal may be generated, and the condensate water may be discharged in a timely manner. Therefore, it is possible to obtain an advantageous effect of inhibiting damage to the storage container due to the inflow of the excessive amount of condensate water into the storage container and minimizing a situation in which the condensate water, which is produced while the fuel cell stack operates, is discharged onto the floor of the workplace.

According to the first exemplary embodiment of the present disclosure, the condensate water storage device may include a gradient sensor configured to detect a gradient of the storage container with respect to a ground surface, and the alarm generation unit may generate the alarm signal when the detection result of the gradient sensor indicates that the gradient of the storage container deviates from a reference gradient.

As described above, the alarm signal may be generated when the gradient of the storage container deviates from the reference gradient (the gradient is larger than the reference gradient). Therefore, the operator may quickly escape from the inclined surface before the condensate water overflows. As a result, it is possible to obtain an advantageous effect of minimizing a situation in which the condensate water, which is produced while the fuel cell stack operates, is discharged onto the floor of the workplace.

Another exemplary embodiment of the present disclosure provides a fuel cell system including: a fuel cell stack; a storage container having a storage space configured to store condensate water produced from the fuel cell stack, and a discharge hole through which the condensate water is discharged to the outside; a valve unit configured to selectively open or close the discharge hole; a connection cable connected to the valve unit; and a winding unit connected to the connection cable and configured to selectively wind the connection cable and manipulate an operation of the valve unit.

Other features and aspects will be apparent from the following detailed description, the drawings, and the claims.

DETAILED DESCRIPTION

Figure 1:
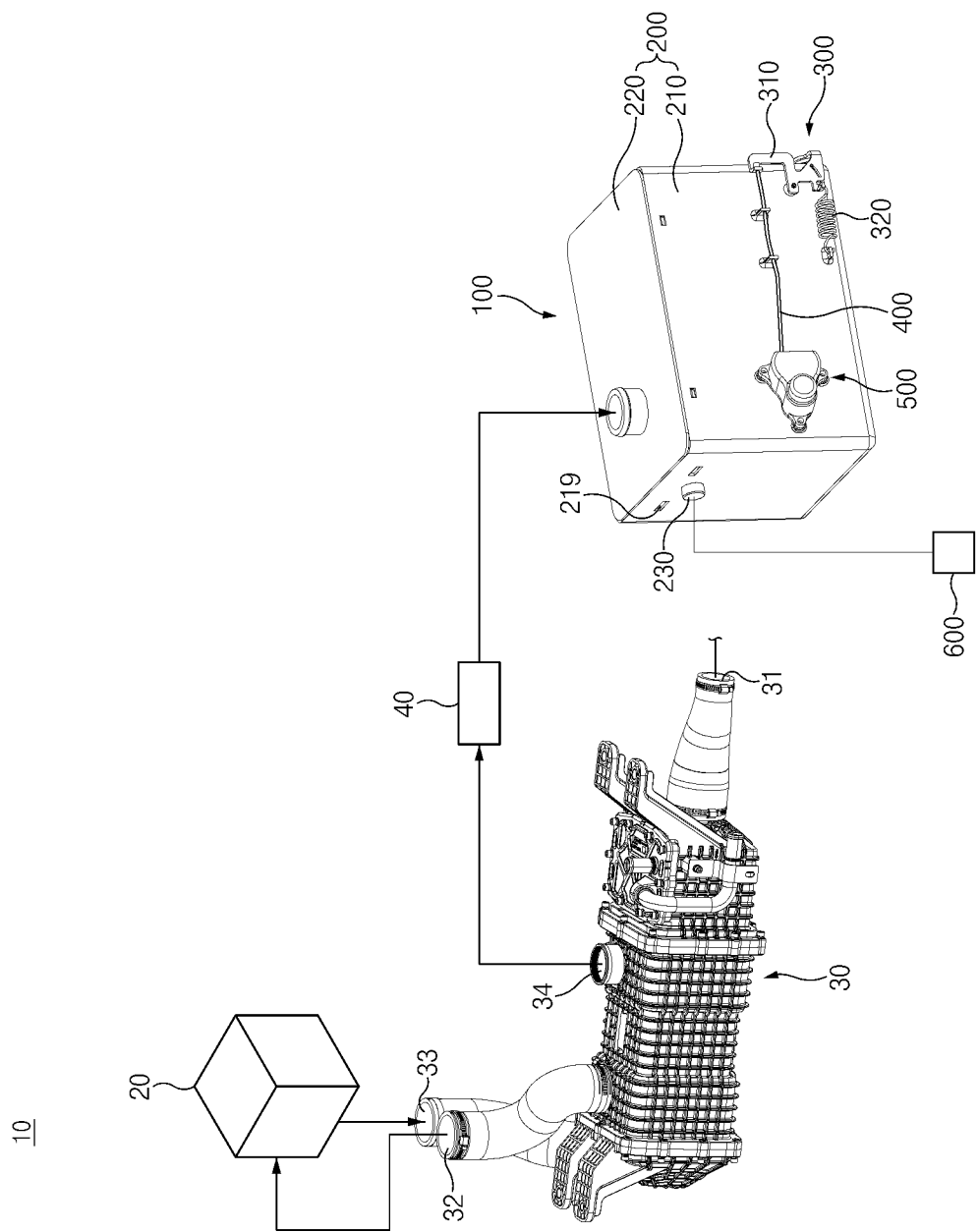
FIG. 1 is a view for explaining a fuel cell system according to a first embodiment of the present disclosure.

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 12, a condensate water storage device 100 according to a first embodiment of the present disclosure includes: a storage container 200 having a storage space for storing condensate water and a discharge hole 211 for discharging the condensate water to the outside; a valve unit 300 configured to selectively open or close the discharge hole 211; a connection cable 400 connected to the valve unit 300; and a winding unit 500 connected to the connection cable 400 and configured to selectively wind the connection cable 400 and manipulate an operation of the valve unit 300.

For reference, the condensate water storage device 100 according to the first embodiment of the present disclosure may be used to store condensate water produced from an object. The present disclosure is not restricted or limited by the type and structure of the object to which the condensate water storage device 100 is applied.

In particular, the condensate water storage device 100 according to the first embodiment of the present disclosure may be used to temporarily store condensate water produced from a fuel cell system 10 applied to a construction machine such as a forklift.

According to another example of the first embodiment of the present disclosure, the condensate water storage device 100 may be applied to mobility vehicles such as various vehicles (e.g., passenger vehicles or commercial vehicles), ships, and aircrafts to which the fuel cell system 10 may be applied.

According to the first exemplary embodiment of the present disclosure, the fuel cell system 10 may include: a fuel cell stack 20; the storage container 200 having a storage space 210a for storing condensate water produced from the fuel cell stack 20, and the discharge hole 211 for discharging the condensate water to the outside; the valve unit 300 configured to selectively open or close the discharge hole 211; the connection cable 400 connected to the valve unit 300; and the winding unit 500 connected to the connection cable 400 and configured to selectively wind the connection cable 400 and manipulate the operation of the valve unit 300.

The fuel cell stack 20 refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may have various structures capable of producing electricity by means of an oxidation-reduction reaction between fuel (e.g., hydrogen) and an oxidant (e.g., air).

For example, the fuel cell may include: a membrane electrode assembly (MEA) (not illustrated) having catalyst electrode layers in which electrochemical reactions occur and which are attached to two opposite sides of an electrolyte membrane through which hydrogen ions move; a gas diffusion layer (GDL) (not illustrated) configured to uniformly distribute reactant gases and transfer generated electrical energy; a gasket (not illustrated) and a fastener (not illustrated) configured to maintain leakproof sealability for the reactant gases and a coolant and maintain an appropriate fastening pressure; and a separator (bipolar plate) (not illustrated) configured to move the reactant gases and the coolant.

More specifically, in the fuel cell, hydrogen, which is fuel, and air (oxygen), which is an oxidant, are supplied to an anode and a cathode of the membrane electrode assembly, respectively, through flow paths in the separator, such that the hydrogen is supplied to the anode, and the air is supplied to the cathode.

The hydrogen supplied to the anode is decomposed into hydrogen ions (protons) and electrons by catalysts in the electrode layers provided at two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons transmitted through the separator meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

According to the first exemplary embodiment of the present disclosure, the fuel cell system 10 may include a humidifier 30 configured to humidify inflow gas (dry air) by using moist air discharged from the fuel cell stack 20.

The humidifier 30 may have various structures capable of humidifying the inflow gas by using the moist air discharged from the fuel cell stack 20. The present disclosure is not restricted or limited by the type and structure of the humidifier 30.

For example, the humidifier 30 may include an inflow gas supply port 31 through which inflow gas is introduced (supplied), an inflow gas discharge port 32 through which the (humidified) inflow gas having passed through the interior of the humidifier 30 is discharged, a moist air supply port 33 through which moist air discharged from the fuel cell stack 20 is supplied, and a moist air discharge port 34 through which the moist air, which has humidified the inflow gas, is discharged to the outside.

The inflow gas supplied through the inflow gas supply port 31 may be humidified by the moist air while passing through a humidification membrane (e.g., a hollow fiber membrane) (not illustrated) disposed in the humidifier 30. Then, the humidified inflow gas may be supplied to the fuel cell stack 20 through the inflow gas discharge port 32.

Further, the moist air (or produced water) discharged from the fuel cell stack 20 may be supplied to the moist air supply port 33, humidify the inflow gas in the humidifier 30, and then be discharged to the outside of the humidifier 30 through the moist air discharge port 34.

According to the first exemplary embodiment of the present disclosure, the storage container 200 may serve to store the condensate water discharged to the outside of the humidifier 30 through the moist air discharge port 34.

In particular, a silencer 40 may be disposed on a connection line (not illustrated) that connects the humidifier 30 and the storage container 200. The silencer 40 may serve to reduce discharge noise of exhaust gas discharged along the connection line.

In the first embodiment of the present disclosure illustrated and described above, the example has been described in which the condensate water produced from the fuel cell stack 20 is supplied to the storage container 200 via the humidifier 30 and the silencer 40. However, according to another example of the first embodiment of the present disclosure, the condensate water produced from the fuel cell stack may be supplied directly to the storage container.

Figure 2:
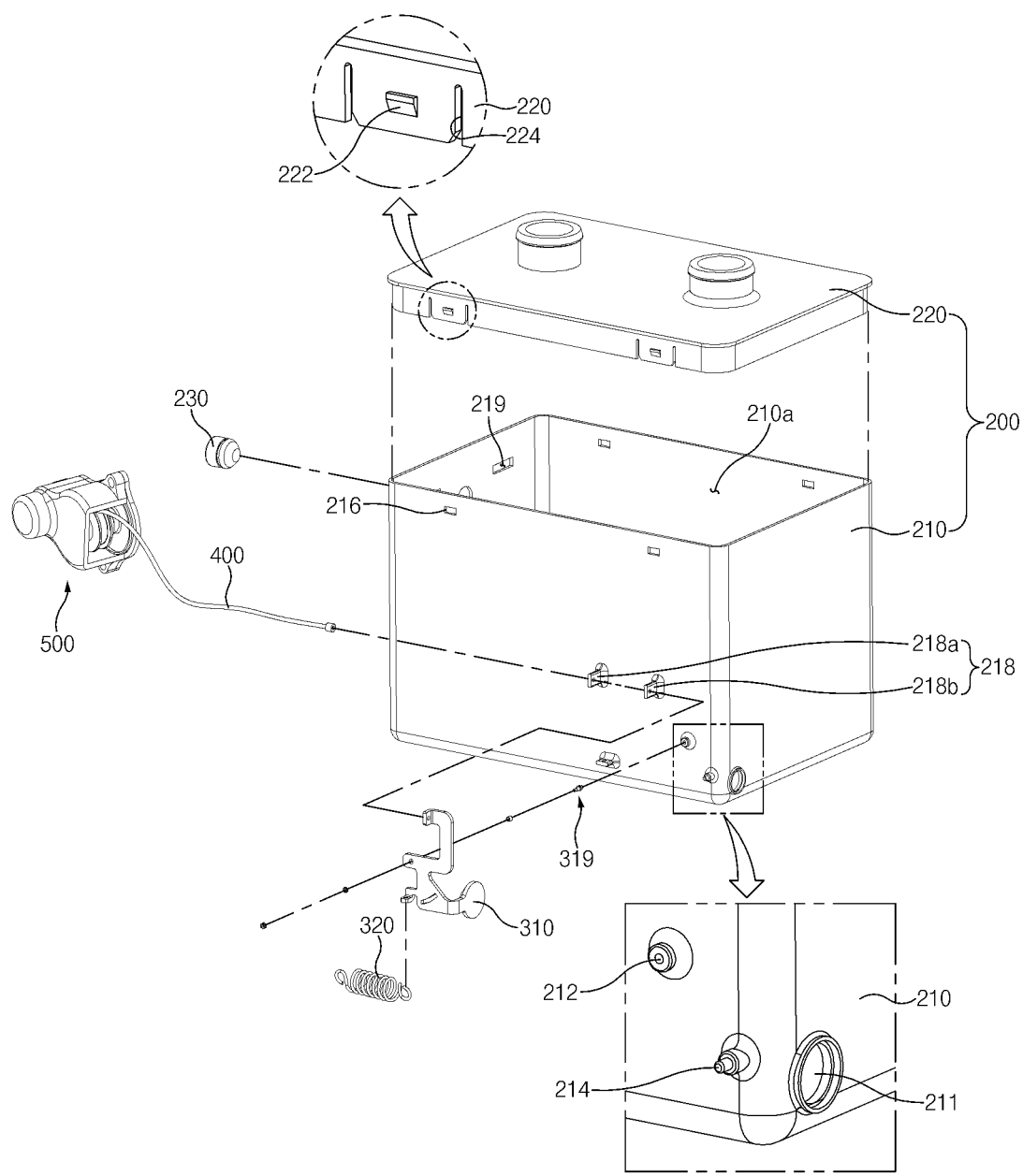
FIG. 2 is a view for explaining a condensate water storage device of the fuel cell system according to the first embodiment of the present disclosure.
Figure 3:
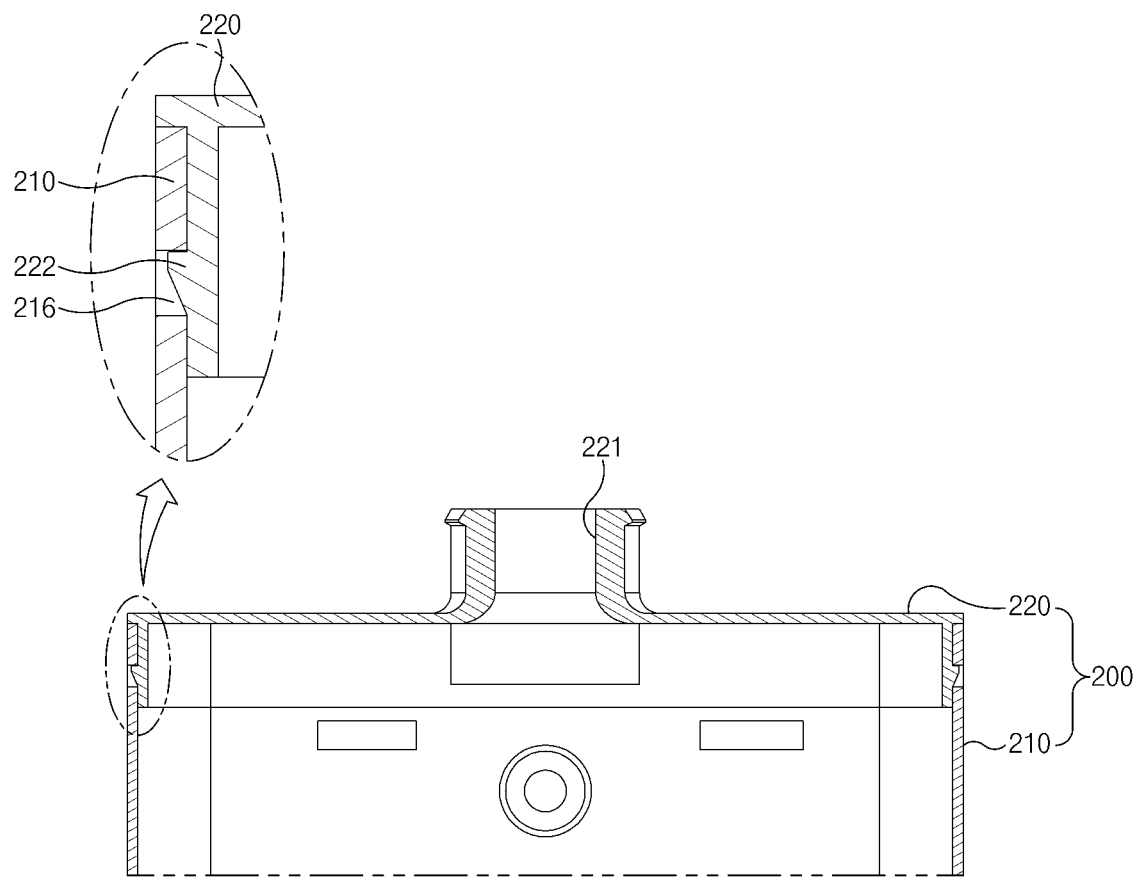
FIG. 3 is a view for explaining a storage container of the fuel cell system according to the first embodiment of the present disclosure.

Referring to FIGS. 1 to 3, the storage container 200 has the storage space 210a for storing the condensate water (e.g., the condensate water produced from the fuel cell stack), and the discharge hole 211 for discharging the condensate water to the outside.

The storage container 200 may have various structures having the storage space 210a and the discharge hole 211. The present disclosure is not restricted or limited by the shape and structure of the storage container 200.

For example, the storage container 200 may include a container main body 210 having the storage space 210a, and a container cover 220 configured to cover the storage space 210a.

The container main body 210 may be variously changed in shape and structure in accordance with required conditions and design specifications. The present disclosure is not restricted or limited by the shape and structure of the container main body 210. For example, the container main body 210 may be provided in the form of a quadrangular box having the storage space 210a opened at an upper side thereof.

For example, the discharge hole 211 (e.g., the circular discharge hole) may be provided in a sidewall portion of the container main body 210, and the condensate water stored in the storage space 210a may be discharged to the outside of the storage container 200 through the discharge hole 211.

The container cover 220 is disposed at an upper side of the container main body 210 and serves to cover the storage space 210a. The container cover 220 may have an inlet port 221, and one end of the connection line configured to connect the humidifier 30 (the moist air discharge port) and the storage container 200 may be connected to the inlet port 221.

According to another example of the first embodiment of the present disclosure, the discharge hole may be provided in a bottom portion of the container main body. In addition, according to still another example of the first embodiment of the present disclosure, two or more inlet ports may be provided in the container cover. Alternatively, the inlet port may be provided in the container main body instead of the container cover.

Referring to FIGS. 2 and 3, according to the first exemplary embodiment of the present disclosure, the condensate water storage device 100 may include locking grooves 216 provided in the container main body 210, locking protrusions 222 provided on the container cover 220 and configured to be locked to the locking grooves 216, and cut-out slits 224 provided in the container cover 220 and disposed adjacent to the locking protrusions 222.

The locking protrusion 222 may have various structures capable of being locked to the locking groove 216. The present disclosure is not restricted or limited by the structure of the locking protrusion 222.

For example, when the container cover 220 is coupled to an upper portion of the container main body 210, the locking protrusions 222 may be accommodated in the locking grooves 216 and locked to inner wall surfaces of the locking grooves 216.

Since the container cover 220 and the container main body 210 are locked to each other by means of the locking grooves 216 and the locking protrusions 222 as described above, it is possible to obtain an advantageous effect of stably maintaining the state in which the container cover 220 is coupled to the container main body 210.

In addition, one or more cut-out slits 224 may be provided in the container cover 220 and disposed adjacent to the locking protrusion 222.

The cut-out slit 224 may be made by partially removing (cutting) a part of the container cover 220. The present disclosure is not restricted or limited by the shape and structure of the cut-out slit 224.

For example, the cut-out slits 224 may be provided in an upward/downward direction and disposed at two opposite left and right sides of the locking protrusion 222 based on the locking protrusion 222.

According to another example of the first embodiment of the present disclosure, the cut-out slit may be provided in a leftward/rightward direction or other directions based on the locking protrusion. Alternatively, the cut-out slit may have a curved shape such as an 'S' shape or a 'C' shape.

As described above, the cut-out slits 224 may be provided at the periphery of the locking protrusion 222, which makes it possible to improve the dynamic properties of the locking protrusion 222 (the properties that allow the locking protrusion 222 to freely move) relative to the container cover 220 and make it easy to couple and separate the locking protrusion 222 to and from the locking groove 216.

Figure 4:
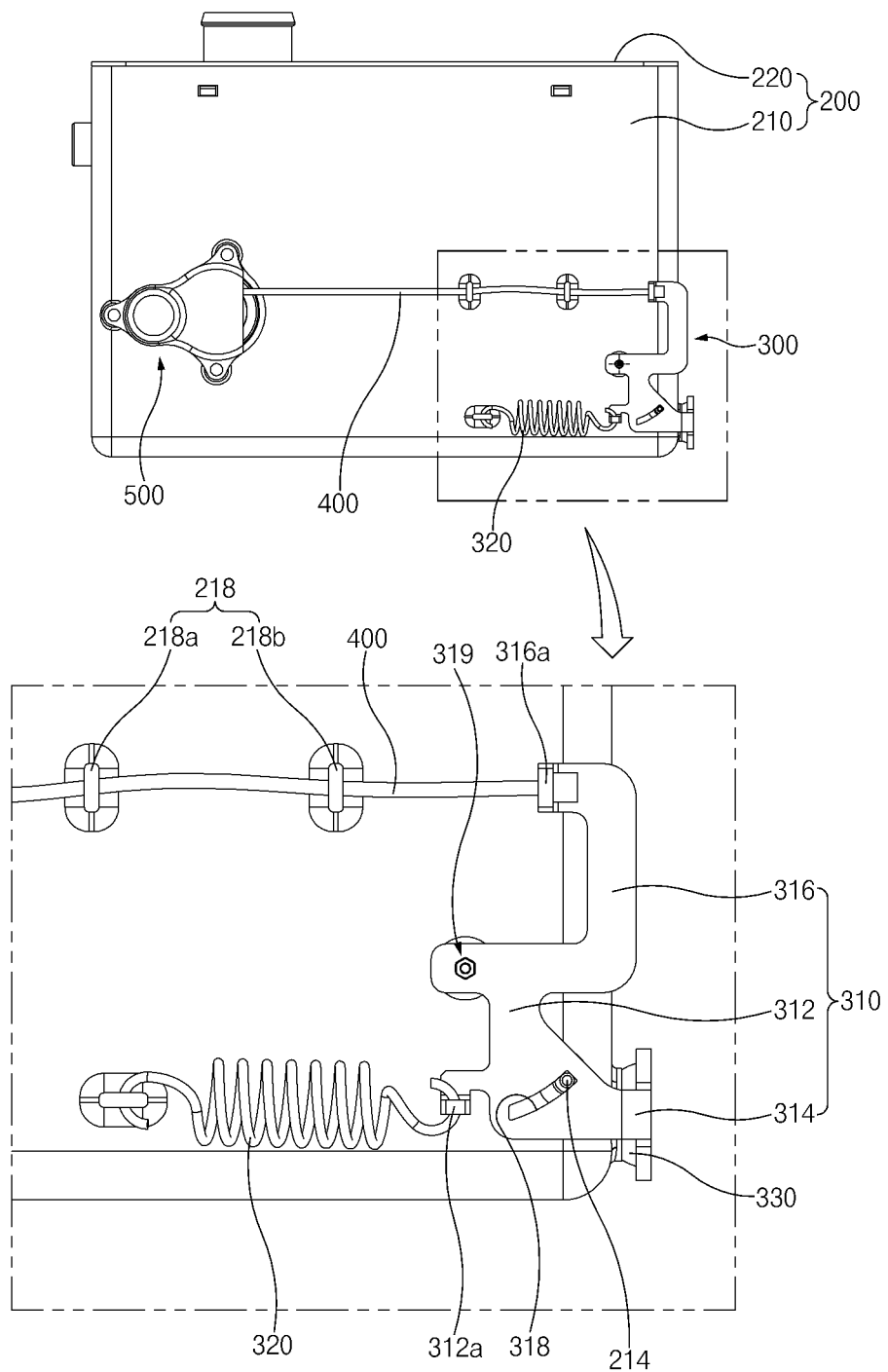
FIG. 4 is a view for explaining a valve unit of the fuel cell system according to the first embodiment of the present disclosure.
Figure 5:
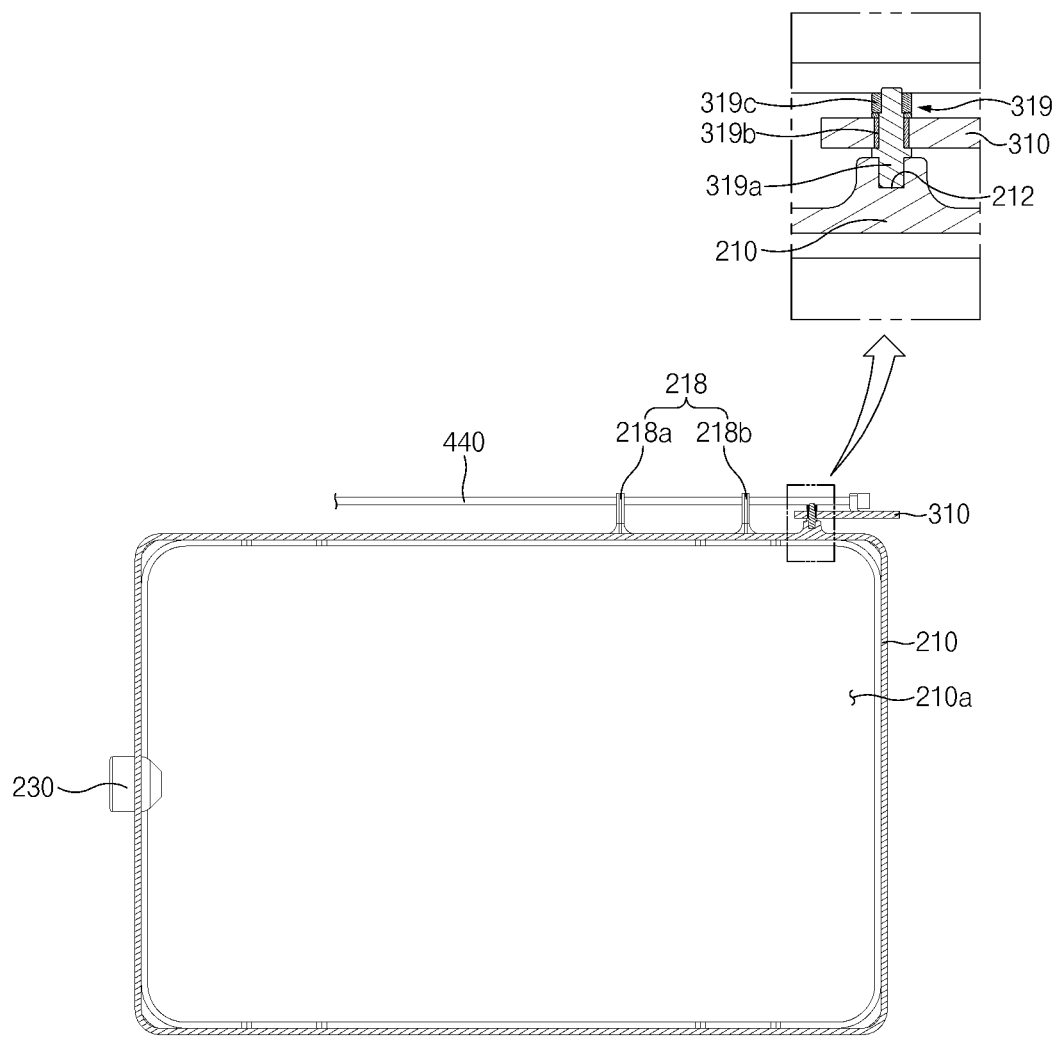
FIGS. 5 to 7 are views for explaining a hinge module of the fuel cell system according to the first embodiment of the present disclosure.
Figure 6:
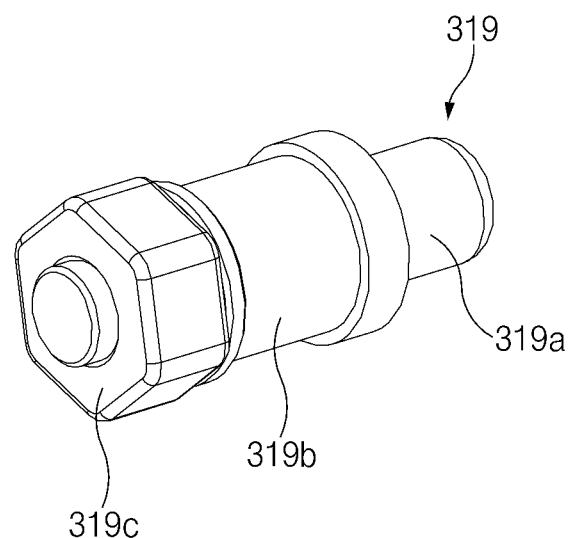
Figure 7:
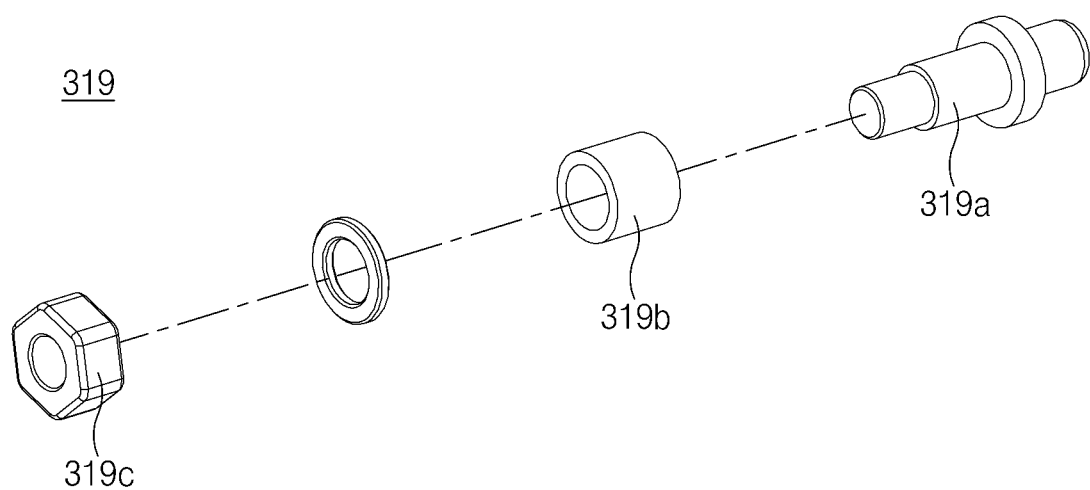
Figure 8:
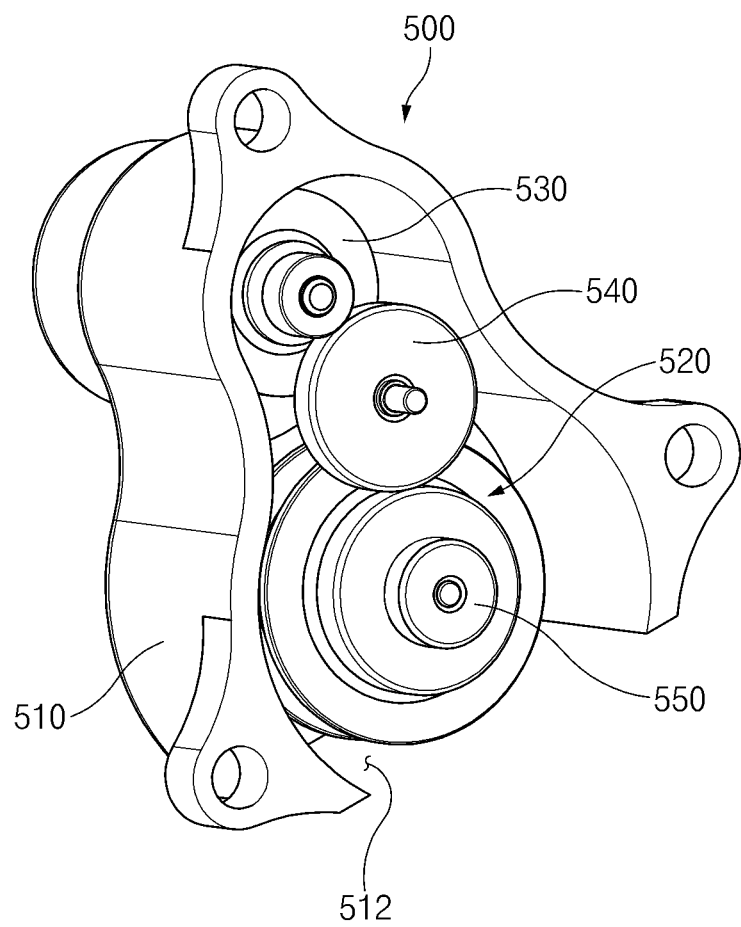
FIGS. 8 and 9 are views for explaining a winding unit of the fuel cell system according to the first embodiment of the present disclosure.
Figure 9:
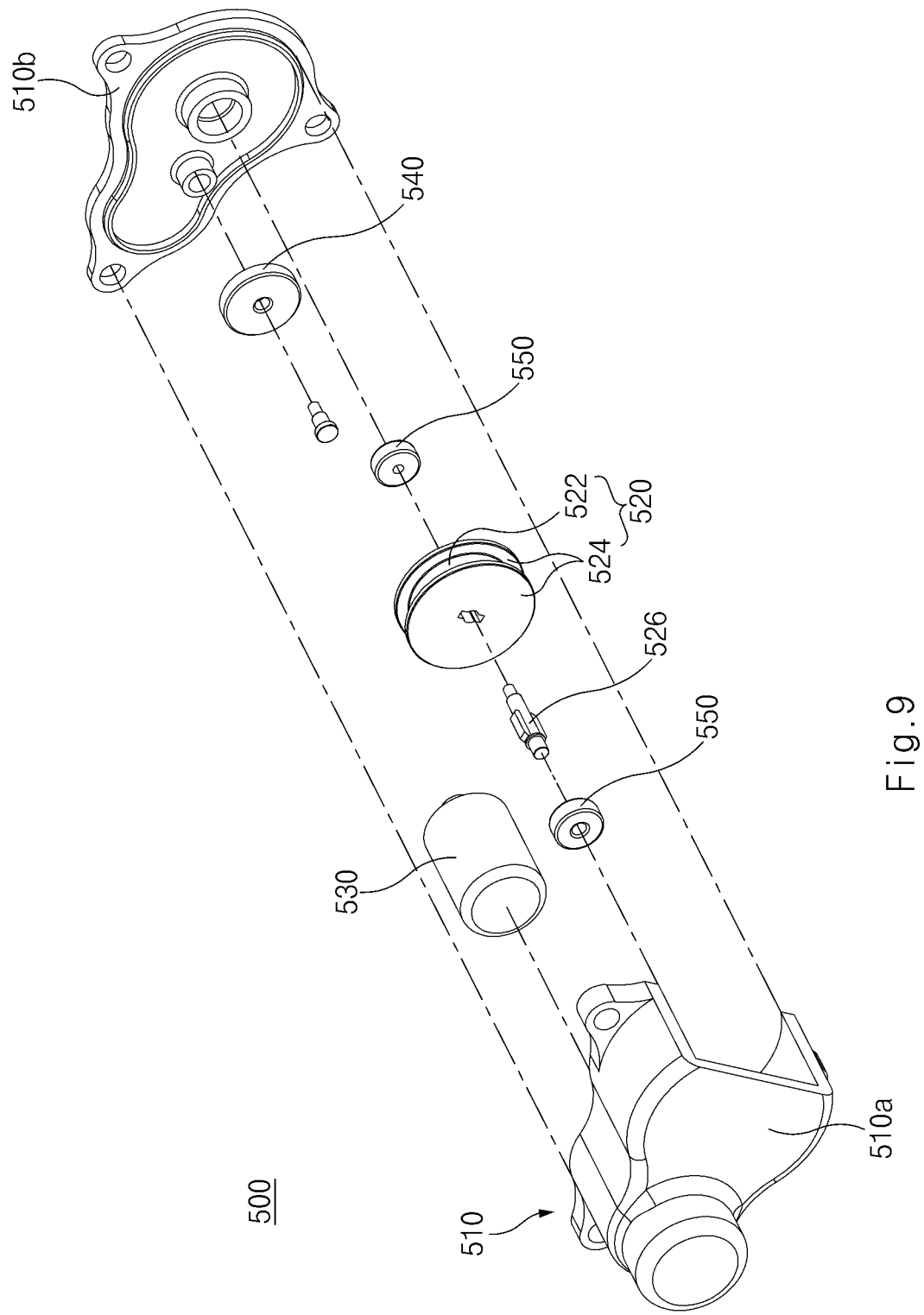
Figure 10:
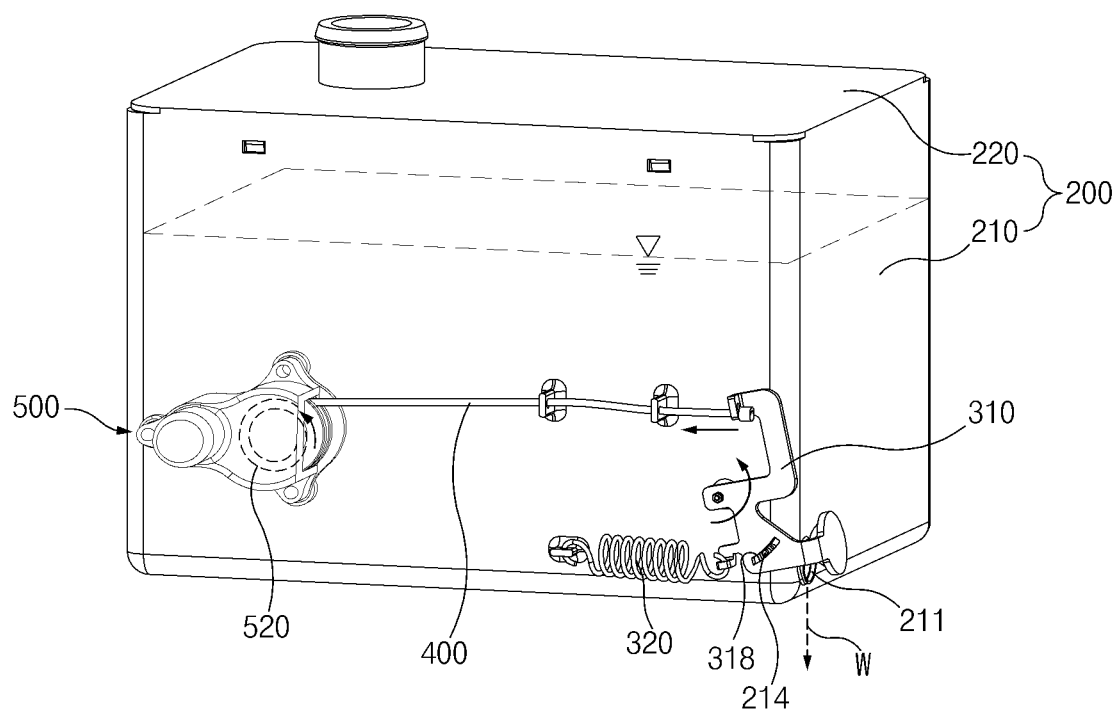
FIG. 10 is a view for explaining an opened state of a discharge hole of the fuel cell system according to the first embodiment of the present disclosure.
Figure 11:
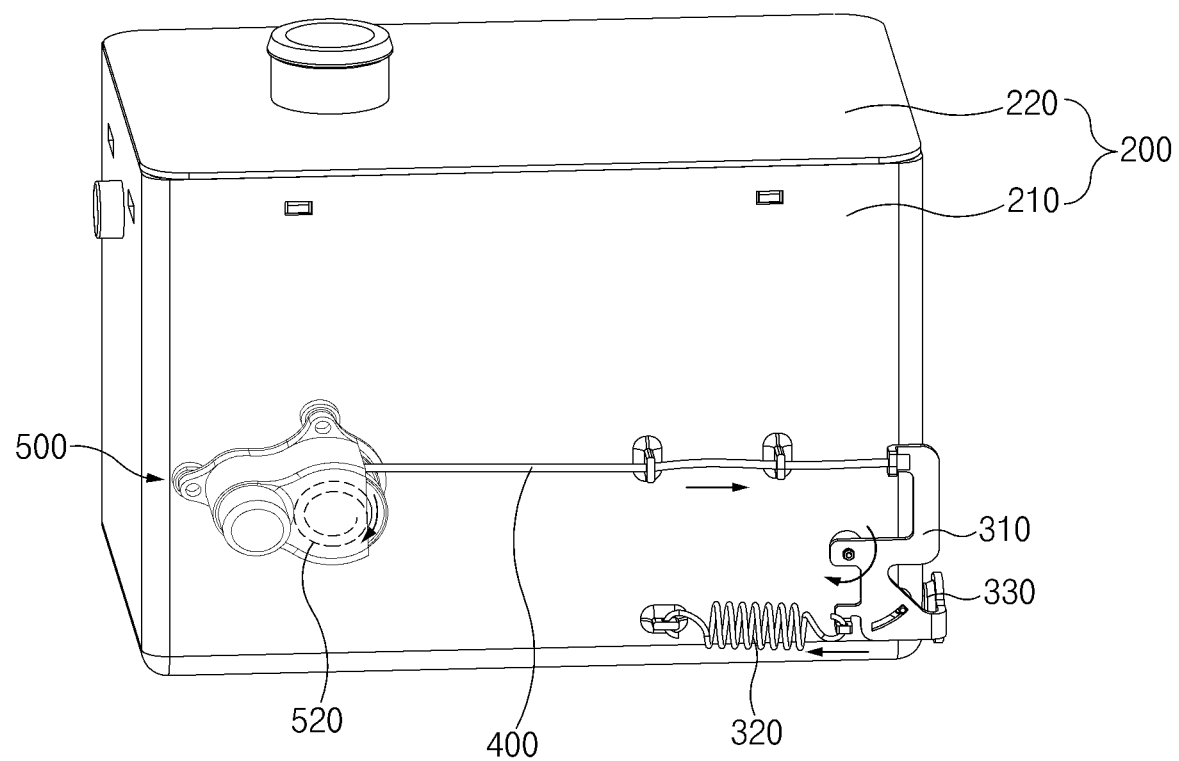
FIG. 11 is a view for explaining a closed state of the discharge hole of the fuel cell system according to the first embodiment of the present disclosure.

Referring to FIGS. 4, 10, and 11, the valve unit 300 serves to selectively open or close the discharge hole 211.

The valve unit 300 may have various structures capable of selectively opening or closing the discharge hole 211. The present disclosure is not restricted or limited by the structure of the valve unit 300.

For example, the valve unit 300 may include: a valve member 310 configured to be movable from a first position at which the valve member 310 closes the discharge hole 211 to a second position at which the valve member 310 opens the discharge hole 211; and an elastic member 320 configured to provide an elastic force to allow the valve member 310 to move to the first position.

Hereinafter, an example will be described in which the valve unit 300 is disposed outside (on an outer surface of) the storage container 200.

In this case, the configuration in which the valve member 310 is positioned at the first position means that the valve member 310 is positioned to close the discharge hole 211, and the configuration in which the valve member 310 is positioned at the second position means that the valve member 310 is positioned to open the discharge hole 211.

The valve member 310 may be configured to move from the first position to the second position in various ways in accordance with required conditions and design specifications.

For example, the valve member 310 may be configured to rotate from the first position to the second position (or from the second position to the first position).

According to the first exemplary embodiment of the present disclosure, the valve member 310 may include: a body portion 312 connected to the storage container 200 and configured to be rotatable from the first position to the second position; an opening/closing portion 314 integrally extending from one end of the body portion 312 and configured to open or close the discharge hole 211; and a connection portion 316 integrally extending from the other end of the body portion and connected to the connection cable 400.

More specifically, the opening/closing portion 314 may be integrally connected to the body portion 312 and open or close the discharge hole 211 while rotating together with the body portion 312 when the body portion 312 rotates.

The body portion 312 may be configured to rotate relative to the storage container 200 in various ways in accordance with required conditions and design specifications. The present disclosure is not restricted or limited by the structure for rotating the body portion 312 relative to the storage container 200.

For example, the condensate water storage device 100 may include a hinge module 319 configured to connect the body portion and the storage container 200 so that the body portion is rotatable.

The hinge module 319 may be variously changed in structure in accordance with required conditions and design specifications. The present disclosure is not restricted or limited by the structure of the hinge module 319.

According to the first exemplary embodiment of the present disclosure, the hinge module 319 may include: a hinge shaft 319a fixed to the storage container 200 and configured to support the body portion so that the body portion is rotatable; a bushing 319b interposed between the body portion 312 and the hinge shaft 319a; and a fastening member 319c fastened to the hinge shaft 319a and configured to fasten the body portion to the hinge shaft 319a.

One end of the hinge shaft 319a may be fixed to an outer surface of the container main body 210. In particular, a press-fit groove 212 may be provided in the outer surface of the container main body 210, and one end of the hinge shaft 319a may be press-fitted into the press-fit groove 212.

Since the press-fit groove 212, which has a non-penetrating structure instead of a through-hole having a penetrating structure, is provided in the storage container 200 and one end of the hinge shaft 319a is press-fitted into the press-fit groove 212 as described above, it is possible to obtain an advantageous effect of basically preventing a leak of condensate water through the connection part (the press-fit groove) to which the hinge shaft 319a is connected.

The bushing 319b may have a hollow cylindrical shape that partially surrounds the hinge shaft 319a. The bushing 319b may be interposed between the body portion 312 and the hinge shaft 319a. Since the bushing 319b is interposed between the body portion 312 and the hinge shaft 319a as described above, it is possible to obtain an advantageous effect of ensuring a smooth rotation of the valve member 310 (body portion) relative to the container main body 210 and improving rotational stability of the valve member 310.

In a state in which the valve member 310 is assembled with the hinge shaft 319a, the fastening member 319c may be fastened to the other end of the hinge shaft 319a and lock an assembled state of the valve member 310.

A typical nut may be used as the fastening member 319c. The present disclosure is not restricted or limited by the type and structure of the fastening member 319c.

In particular, a washer (not illustrated) may be disposed between the fastening member 319c and the bushing 319b and serve to ensure a smooth rotation of the bushing 319b.

Referring to FIG. 4, according to the first exemplary embodiment of the present disclosure, the condensate water storage device 100 may include a guide slot 318 provided in the valve member 310, and a guide protrusion 214 provided on the storage container 200 and accommodated in the guide slot 318, the guide protrusion 214 being movable along the guide slot 318.

For example, the body portion may have the guide slot 318 having an approximately arc shape formed along a rotation route along which the body portion rotates relative to the storage container 200. The guide protrusion 214 may be provided on the outer surface of the container main body 210 and move along the guide slot 318.

Since the guide protrusion 214 moves along the guide slot 318 as described above, it is possible to obtain an advantageous effect of minimizing vibration and swaying of the valve member 310 and inhibiting the valve member 310 from deviating from a predetermined movement route when the valve member 310 rotates relative to the storage container 200.

The elastic member 320 serves to elastically support the movement (rotation) of the valve member 310 relative to the storage container 200.

More specifically, the elastic member 320 serves to provide an elastic force that allows the valve member 310 to move to the first position.

Since the elastic member 320 elastically supports the movement (rotation) of the valve member 310 relative to the storage container 200 as described above, the opening/closing portion may more effectively come into close contact with the discharge hole 211. Therefore, it is possible to obtain an advantageous effect of improving performance in closing the discharge hole 211 by means of the opening/closing portion.

A typical elastic means capable of elastically supporting the movement of the valve member 310 relative to the storage container 200 may be used as the elastic member 320. The present disclosure is not restricted or limited by the type and structure of the elastic member 320.

For example, a spring may be used as the elastic member 320. One end of the elastic member 320 may be coupled to the outer surface of the container main body 210, and the other end of the elastic member 320 may be coupled to the valve member 310 (e.g., a first coupling portion).

According to the first exemplary embodiment of the present disclosure, the condensate water storage device 100 may include: a first coupling portion 312a protruding from a lateral surface of the body portion 312 and coupled to the elastic member 320; and a second coupling portion 316a protruding from a lateral surface of the connection portion 316 and coupled to the connection cable 400.

For example, the first coupling portion 312a may have a first coupling hole (not illustrated) to which the elastic member 320 is coupled, and the second coupling portion 316a may have a second coupling hole (not illustrated) to which the connection cable 400 is coupled.

Since the elastic member 320 and the connection cable 400 are respectively coupled to the first and second coupling portions 312a and 316a respectively protruding from the lateral surfaces of the body and connection portions as described above, it is possible to obtain an advantageous effect of minimizing rotational interference between the elastic member 320 and the connection cable 400 and ensuring the smooth rotation of the valve member 310.

According to another example of the first embodiment of the present disclosure, the elastic member may be configured to elastically support the opening/closing portion or other portions instead of the body portion.

According to the first exemplary embodiment of the present disclosure, the condensate water storage device 100 may include a valve sealing member 330 interposed between the opening/closing portion 314 and the discharge hole 211.

The valve sealing member 330 serves to seal a gap between the opening/closing portion 314 and the discharge hole 211.

The valve sealing member 330 may have various structures and be made of various materials in accordance with required conditions and design specifications. The present disclosure is not restricted or limited by the structure and material of the valve sealing member 330.

For example, the valve sealing member 330 may be made of an elastic material such as rubber, silicone, or urethane.

According to the first exemplary embodiment of the present disclosure, the valve sealing member 330 may have an approximately dome shape having a diameter corresponding to the discharge hole 211 and be provided integrally with a bottom surface of the opening/closing portion 314. For example, the valve sealing member 330 may be integrated with the valve member 310 by double injection molding.

According to another example of the first embodiment of the present disclosure, the valve sealing member may be attached to (or assembled with) the opening/closing portion.

The valve sealing member 330 may seal the gap between the opening/closing portion 314 and the discharge hole 211 in a state in which one surface of the valve sealing member 330 is seated in the discharge hole 211 (the valve member 310 is moved to the first position). Therefore, it is possible to obtain an advantageous effect of minimizing a leak of the condensate water through the gap between the opening/closing portion 314 and the discharge hole 211.

Meanwhile, in the first embodiment of the present disclosure illustrated and described above, the example has been described in which the valve member 310 rotates from the first position to the second position. However, according to another example of the first embodiment of the present disclosure, the valve member 310 may be configured to rectilinearly move from the first position to the second position.

The connection cable 400 serves to connect the winding unit 500 and the valve unit 300 and selectively manipulate the operation of the valve unit 300.

More specifically, one end of the connection cable 400 may be connected to the winding unit 500 (e.g., a cable drum), and the other end of the connection cable 400 may be connected to the valve member 310. When the winding unit 500 winds the connection cable 400, the connection cable 400 may be pulled, such that the valve member 310 may operate (e.g., rotate to the second position) in conjunction with the pulled connection cable 400.

A cable made of metal or synthetic resin may be used as the connection cable 400. The present disclosure is not restricted or limited by the material and type of the connection cable 400.

In particular, the condensate water storage device 100 may include a support part 218 configured to support the connection cable 400 on the storage container 200.

The support part 218 serves to inhibit a tangle (twist) and separation of the connection cable 400 and stably maintain an arrangement state of the connection cable 400.

The support part 218 may have various structures capable of supporting the connection cable 400. The present disclosure is not restricted or limited by the structure of the support part 218.

For example, the support part 218 may include a first support protrusion 218a disposed on the storage container 200 and configured to support the connection cable 400, and a second support protrusion 218b disposed on the storage container 200, spaced apart from the first support protrusion 218a, and configured to support the connection cable 400. For example, the first support protrusion 218a may have a first support hole (not illustrated) that accommodates the connection cable 400, and the second support protrusion 218b may have a second support hole that accommodates the connection cable 400.

According to another example of the first embodiment of the present disclosure, the support part may include only a single support protrusion or three or more support protrusions.

Referring to FIGS. 2 and 8 to 11, the winding unit 500 is connected to the valve unit 300 by means of the connection cable 400 and selectively manipulate the operation of the valve unit 300.

More specifically, the winding unit 500 may selectively move the valve member 310 from the first position to the second position by selectively winding the connection cable 400.

The winding unit 500 may have various structures capable of selectively winding the connection cable 400. The present disclosure is not restricted or limited by the structure of the winding unit 500.

For example, the winding unit 500 may include: a housing 510 mounted on the storage container and having an opening portion 512 through which the connection cable 400 may enter or exit the housing 510; a cable drum 520 rotatably disposed in the housing 510 and configured to wind the connection cable 400; a driving part 530 disposed in the housing 510 and configured to provide driving power for rotating the cable drum 520; and a power transmission member 540 configured to transmit the driving power of the driving part 530 to the cable drum 520. When the connection cable 400 is wound around the cable drum 520 by the rotation of the cable drum 520, the connection cable 400 may be pulled, and the valve member 310 may be moved to the second position.

The housing 510 may have various structures each having an accommodation space therein. The present disclosure is not restricted or limited by the structure and shape of the housing 510.

For example, the housing 510 may include a first cover 510*a*, and a second cover 510*b* assembled with the first cover 510*a* so that the first and second covers 510*a* and 510*b* collectively define an accommodation space. The housing 510 may be coupled to a lateral surface of the storage container.

The housing 510 may have the opening portion 512 provided at one side of the housing 510 and configured to allow the connection cable 400 to enter and exit the housing 510 (to be retracted into and extended from the housing 510). The opening portion 512 may be variously changed in size and structure in accordance with required conditions and design specifications.

According to another example of the first embodiment of the present disclosure, the housing may have only a single cover or be made by assembling three or more covers. Alternatively, the housing may be coupled to an upper surface (or a bottom surface) of the storage container or coupled to other positions on the storage container.

The cable drum 520 may be rotatably disposed in the housing 510 and wind the connection cable 400.

The cable drum 520 may have various structures capable of winding the connection cable 400. The present disclosure is not restricted or limited by the structure of the cable drum 520.

For example, the cable drum 520 may include: a drum body 522 rotatably disposed in the housing 510 and configured to wind the connection cable 400; and flange portions 524 respectively disposed at ends of the drum body 522 and each having a larger cross-sectional area than the drum body 522.

For example, the drum body 522 may have a cylindrical shape, and the connection cable 400 may be wound around an outer peripheral surface of the drum body 522.

In particular, one end of the connection cable 400 may be connected (fixed) to the drum body 522. The connection cable 400 may be wound around or unwound from the outer peripheral surface of the drum body 522 depending on a rotation direction of the drum body 522.

The flange portions 524 are respectively disposed at the ends of the drum body 522 and each have a larger cross-sectional area than the drum body 522.

For example, the flange portions 524 may be respectively disposed at the two opposite ends of the drum body 522 and each have a circular plate shape having a larger cross-sectional area (e.g., diameter) than the drum body 522.

Since the flange portions 524 are respectively disposed at the ends of the drum body 522 as described above, it is possible to obtain an advantageous effect of inhibiting the connection cable 400 from being abnormally wound around the drum body 522 and inhibiting the connection cable 400 wound around the drum body 522 from separating from the drum body 522.

The driving part 530 is disposed in the housing 510 and serves to provide driving power for rotating the cable drum 520.

A typical driving source capable of providing the driving power may be used as the driving part 530. The present disclosure is not restricted or limited by the type and structure of the driving part 530.

For example, a motor may be used as the driving part 530. One end of the driving part 530 may be fixed by being press-fitted into a press-fit groove (not illustrated) provided in an inner surface of the housing 510. According to another example of the first embodiment of the present disclosure, a solenoid or hydraulic cylinder (or a pneumatic cylinder) may be used as the driving part. Alternatively, the driving part may be fixed to the housing by a separate fastening member.

The power transmission member 540 serves to transmit the driving power of the driving part 530 to the cable drum 520.

Various members capable of transmitting the driving power of the driving part 530 to the cable drum 520 may be used as the power transmission member 540. The present disclosure is not restricted or limited by the type and structure of the power transmission member 540.

For example, a typical gear (e.g., pinion gear), which is rotated by the driving part 530, may be used as the power transmission member 540.

For example, the cable drum 520 may have a gear portion (not illustrated), and the power transmission member 540 (e.g., a gear) may engage with the gear portion. When the power transmission member 540 is rotated by the driving part 530, the cable drum 520 may rotate together with the power transmission member 540.

According to another example of the first embodiment of the present disclosure, the cable drum may be rotated by the driving power of the driving part by means of other power transmission members such as a belt or a rack gear.

According to the first exemplary embodiment of the present disclosure, the condensate water storage device 100 may include bearing members 550 disposed in the housing 510 and configured to support the cable drum 520 so that the cable drum 520 is rotatable.

For example, two opposite ends of a rotary shaft 526 coupled to the cable drum 520 may be rotatably supported by the bearing members 550.

In particular, the rotary shaft 526 may have a non-circular cross-section (e.g., a straight cross-section or a cross-shaped cross-section) so that a rotation of the rotary shaft 526 relative to the cable drum 520 may be inhibited.

Since the cable drum 520 is rotatably supported by the bearing members 550 as described above, it is possible to obtain an advantageous effect of ensuring the smooth rotation of the cable drum 520 relative to the housing 510 and minimizing a loss of rotational force due to frictional resistance occurring when the cable drum 520 rotates.

A typical bearing may be used as the bearing member 550. The present disclosure is not restricted or limited by the type and structure of the bearing member 550.

In particular, the bearing member 550 may be made of a material such as engineering plastic having high lubricity.

In the first embodiment of the present disclosure illustrated and described above, the example has been described in which the valve unit is disposed outside the storage container. However, according to another example of the first embodiment of the present disclosure, the valve unit may be disposed inside the storage container. However, in the case in which the valve unit is disposed inside the storage container, it is difficult to ensure a sufficient storage space for storing the condensate water and it is necessary to inevitably provide a hole in the storage container (the hole through which the connection cable passes) in order to connect the valve unit and the connection cable. For this reason, there is a problem in that there is a likelihood of a leak of condensate water and a sealing member needs to be additionally provided.

In contrast, in the first embodiment of the present disclosure, the valve unit 300 may be disposed outside the storage container 200. Therefore, it is possible to sufficiently ensure the storage space 210a of the storage container 200, and it is not necessary to provide the storage container 200 with the hole used to connect the valve unit 300 and the connection cable 400. As a result, it is possible to obtain an advantageous effect of preventing a leak of the condensate water and simplifying the structure.

Meanwhile, FIG. 10 is a view for explaining an opened state of the discharge hole of the fuel cell system according to the first embodiment of the present disclosure, and FIG. 11 is a view for explaining a closed state of the discharge hole of the fuel cell system according to the first embodiment of the present disclosure.

Referring to FIG. 10, when the connection cable 400 is wound around the cable drum 520 as the cable drum 520 rotates in one direction (e.g., counterclockwise), the connection cable 400 may be pulled by the cable drum 520. As the connection cable 400 is pulled, the valve member 310 connected to the connection cable 400 may be rotated counterclockwise (based on FIG. 10), such that the valve member 310 may be disposed at the position (second position) at which the discharge hole 211 is opened. In this case, the elastic member 320 may be stretched while accumulating the elastic force. In the state in which the discharge hole 211 is opened, condensate water W accommodated in the storage container 200 may be discharged to the outside of the storage container 200 through the discharge hole 211.

In contrast, referring to FIG. 11, when the cable drum 520 rotates in the other direction (e.g., clockwise), the connection cable 400 wound around the cable drum 520 may be loosely unwound. When tension of the connection cable 400 is released (the connection cable 400 is loosened), the valve member 310 may be rotated clockwise (based on FIG. 11) by the elastic force of the elastic member 320, such that the valve member 310 may be disposed at the position (first position) at which the discharge hole 211 is closed. Further, the state in which the valve member 310 closes the discharge hole 211 may be elastically supported by the elastic force of the elastic member 320.

According to the first exemplary embodiment of the present disclosure, the condensate water storage device 100 may include overflow holes 219 provided in the container main body 210, and the condensate water may be discharged to the outside through the overflow holes 219 when a water level of the condensate water exceeds a preset reference water level.

The overflow hole 219 may be variously changed in structure and position in accordance with required conditions and design specifications.

As described above, the overflow holes 219 may be provided in the container main body 210, and the condensate water may be discharged to the outside through the overflow holes 219 when an excessive amount of condensate water flows into the storage container 200. Therefore, it is possible to obtain an advantageous effect of inhibiting damage to the storage container 200 due to the inflow of the excessive amount of condensate water into the storage container 200, thereby improving safety and reliability.

In addition, according to the first exemplary embodiment of the present disclosure, the condensate water storage device 100 may include a level sensor 230 disposed in the storage container 200 and configured to detect the water level of the condensate water.

For example, the level sensor 230 may be disposed on the sidewall portion of the container main body 210. The level sensor 230 may collect the water levels of the condensate water stored in the container main body 210.

Various sensors capable of collecting the water levels of the condensate water may be used as the level sensor 230. The present disclosure is not restricted or limited by the type of level sensor 230 and the method of measuring the water level.

For example, a contact level sensor (e.g., a float switch) or a contactless level sensor (e.g., an ultrasonic level sensor or a capacitance level sensor), which may collect the water level of the condensate water, may be used as the level sensor 230.

According to the first exemplary embodiment of the present disclosure, the condensate water storage device 100 may include an alarm generation unit 600 configured to generate an alarm signal when the detection result of the level sensor 230 indicates that the water level of the condensate water exceeds the preset reference water level.

In this case, the alarm signal may include at least one of an auditory alarm signal made by a typical sound means and a visual alarm signal made by a typical warning lamp. In addition, other various alarm signals may be used to inform a user (operator) of a situation in which the water level of the condensate water is excessively increased.

As described above, when the water level of the condensate water exceeds the preset reference water level, the alarm signal may be generated, and the condensate water may be discharged in a timely manner. Therefore, it is possible to obtain an advantageous effect of inhibiting damage to the storage container 200 due to the inflow of the excessive amount of condensate water into the storage container 200 and minimizing a situation in which the condensate water, which is produced while the fuel cell stack 20 operates, is discharged onto the floor of the workplace.

Figure 12:
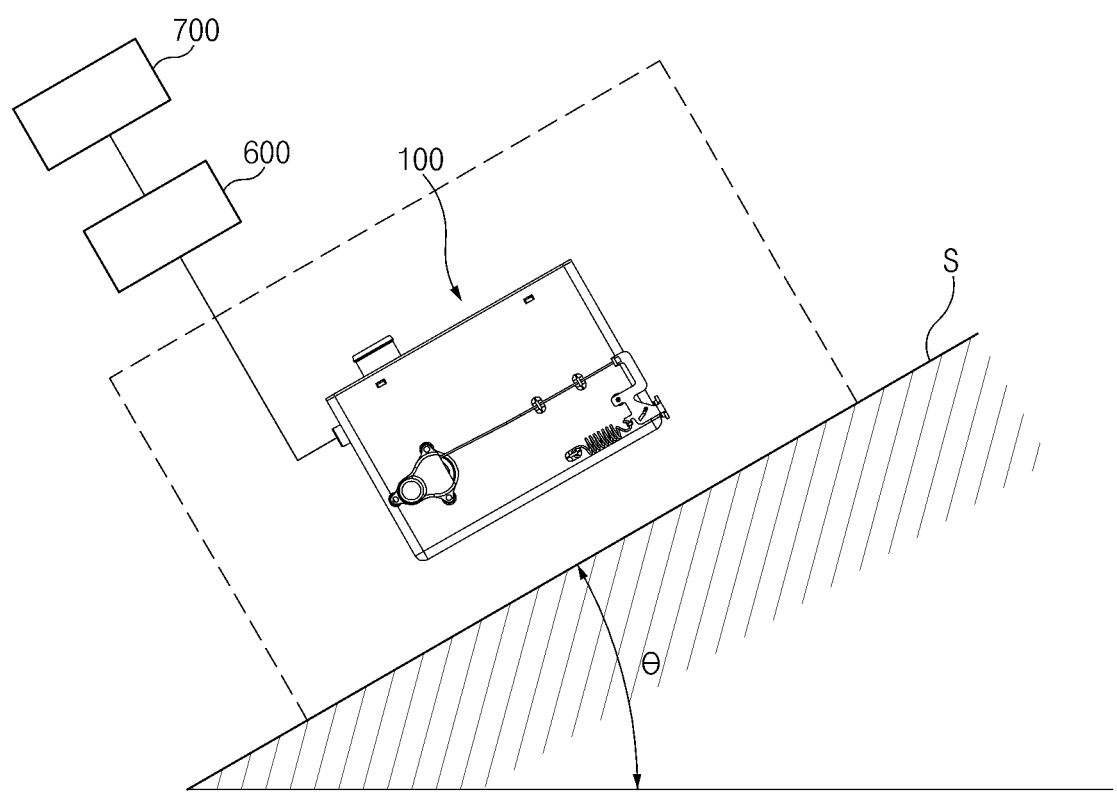
FIG. 12 is a view for explaining a gradient sensor of the fuel cell system according to the first embodiment of the present disclosure.

Referring to FIG. 12, according to the first exemplary embodiment of the present disclosure, the condensate water storage device 100 may include a gradient sensor 700 configured to detect a gradient θ of the storage container with respect to the ground surface. The alarm generation unit 600 may generate the alarm signal when the detection result of the gradient sensor 700 indicates that the gradient θ of the storage container deviates from a preset reference gradient.

For example, the gradient sensor 700 may be disposed on the sidewall portion of the storage container. The gradient sensor 700 may collect the gradients θ of the storage container with respect to the ground surface.

Various sensors capable of detecting the gradient θ of the storage container with respect to the ground surface may be used as the gradient sensor 700. The present disclosure is not restricted or limited by the type of gradient sensor 700 and the method of measuring the gradient.

For example, the gradient sensor 700 may detect the gradient θ of the storage container with respect to the ground surface by using a ball switch, a tilt switch, or the like or detect the gradient θ of the storage container with respect to the ground surface by using a gyro sensor (G-sensor).

Since the alarm signal is generated when the detection result of the gradient sensor 700 indicates that the gradient θ of the storage container deviates from the preset reference gradient as described above, it is possible to obtain an advantageous effect of inhibiting the condensate water from overflowing onto the floor of the workplace having an inclined surface S.

That is, the condensate water collected in the storage container 200 may overflow to the outside when the gradient θ of the storage container with respect to the ground surface is increased to a predetermined degree or higher even though the water level of the condensate water stored in the container main body 210 does not reach a predetermined water level.

However, according to the present disclosure, the alarm signal may be generated when the gradient θ of the storage container 200 deviates from the reference gradient (the gradient θ is larger than the reference gradient). Therefore, the operator may quickly escape from the inclined surface S before the condensate water overflows. As a result, it is possible to obtain an advantageous effect of minimizing a situation in which the condensate water, which is produced while the fuel cell stack 20 operates, is discharged onto the floor of the workplace.

Referring to FIGS. 13 to 24, according to a second exemplary embodiment of the present disclosure, a fuel cell system 10 may include: a fuel cell stack 20; a storage container 1200 having a storage space 1210a for storing condensate water produced from the fuel cell stack 20, and a discharge hole 1211 for discharging the condensate water to the outside; a valve unit 1300 configured to selectively open or close the discharge hole 1211; and an operating unit 1400 connected to the valve unit 1300 and configured to selectively operate the valve unit 1300.

The fuel cell stack 20 refers to a kind of power generation device that generates electrical energy through a chemical reaction of fuel (e.g., hydrogen), and the fuel cell stack may be configured by stacking several tens or hundreds of fuel cells (unit cells) in series.

According to the second exemplary embodiment of the present disclosure, the fuel cell system 10 may include a humidifier 30 configured to humidify inflow gas (dry air) by using moist air discharged from the fuel cell stack 20.

The humidifier 30 may have various structures capable of humidifying the inflow gas by using the moist air discharged from the fuel cell stack 20. The present disclosure is not restricted or limited by the type and structure of the humidifier 30.

For example, the humidifier 30 may include an inflow gas supply port 31 through which inflow gas is introduced (supplied), an inflow gas discharge port 32 through which the (humidified) inflow gas having passed through the interior of the humidifier 30 is discharged, a moist air supply port 33 through which moist air discharged from the fuel cell stack 20 is supplied, and a moist air discharge port 34 through which the moist air, which has humidified the inflow gas, is discharged to the outside.

According to the second exemplary embodiment of the present disclosure, the storage container 1200 may serve to store the condensate water discharged to the outside of the humidifier 30 through the moist air discharge port 134.

In particular, a silencer 40 may be disposed on a connection line (not illustrated) that connects the humidifier 30 and the storage container 1200. The silencer 40 may serve to reduce discharge noise of exhaust gas discharged along the connection line.

Figure 13:
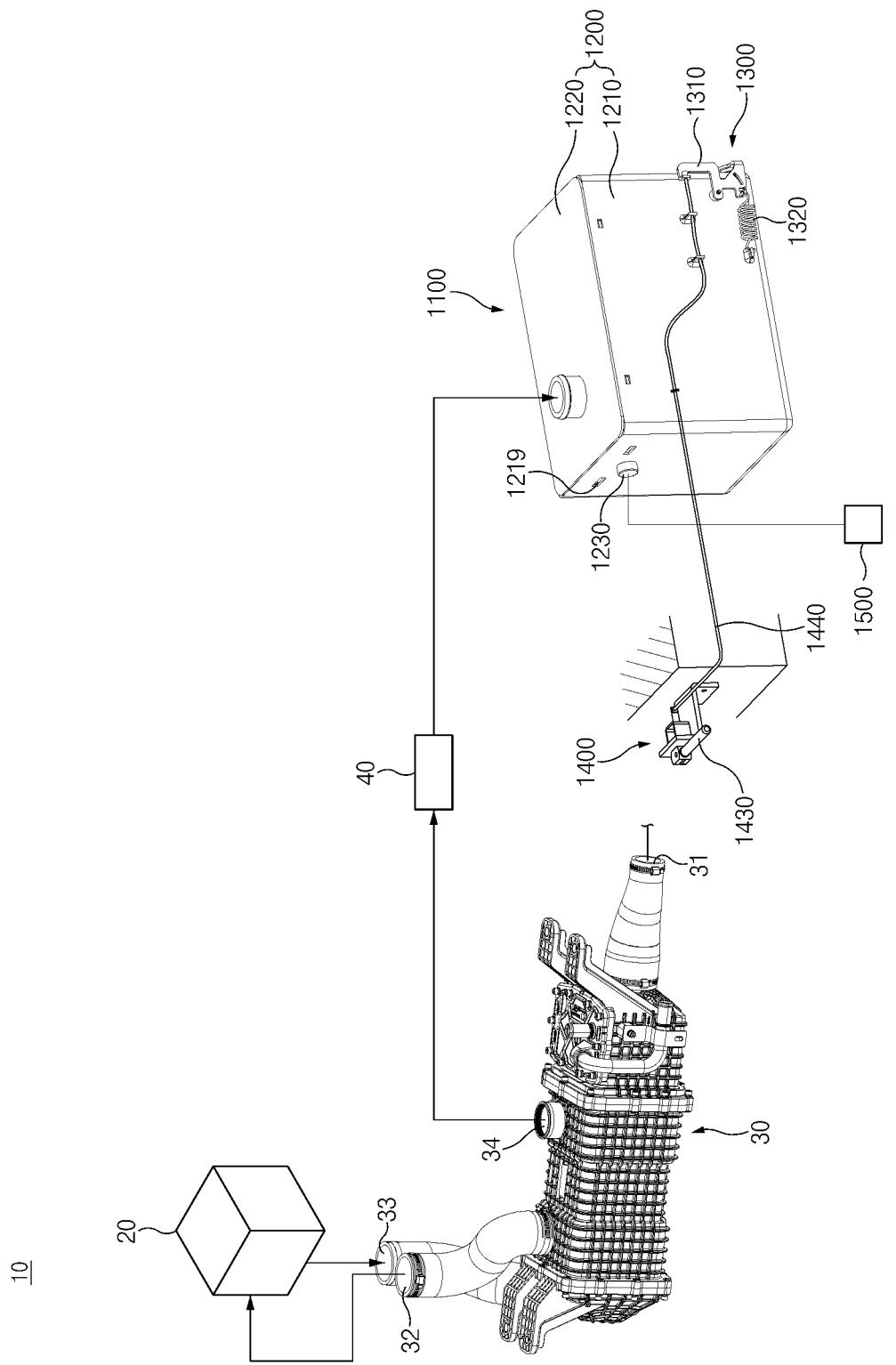
FIG. 13 is a view for explaining a fuel cell system according to a second embodiment of the present disclosure.
Figure 14:
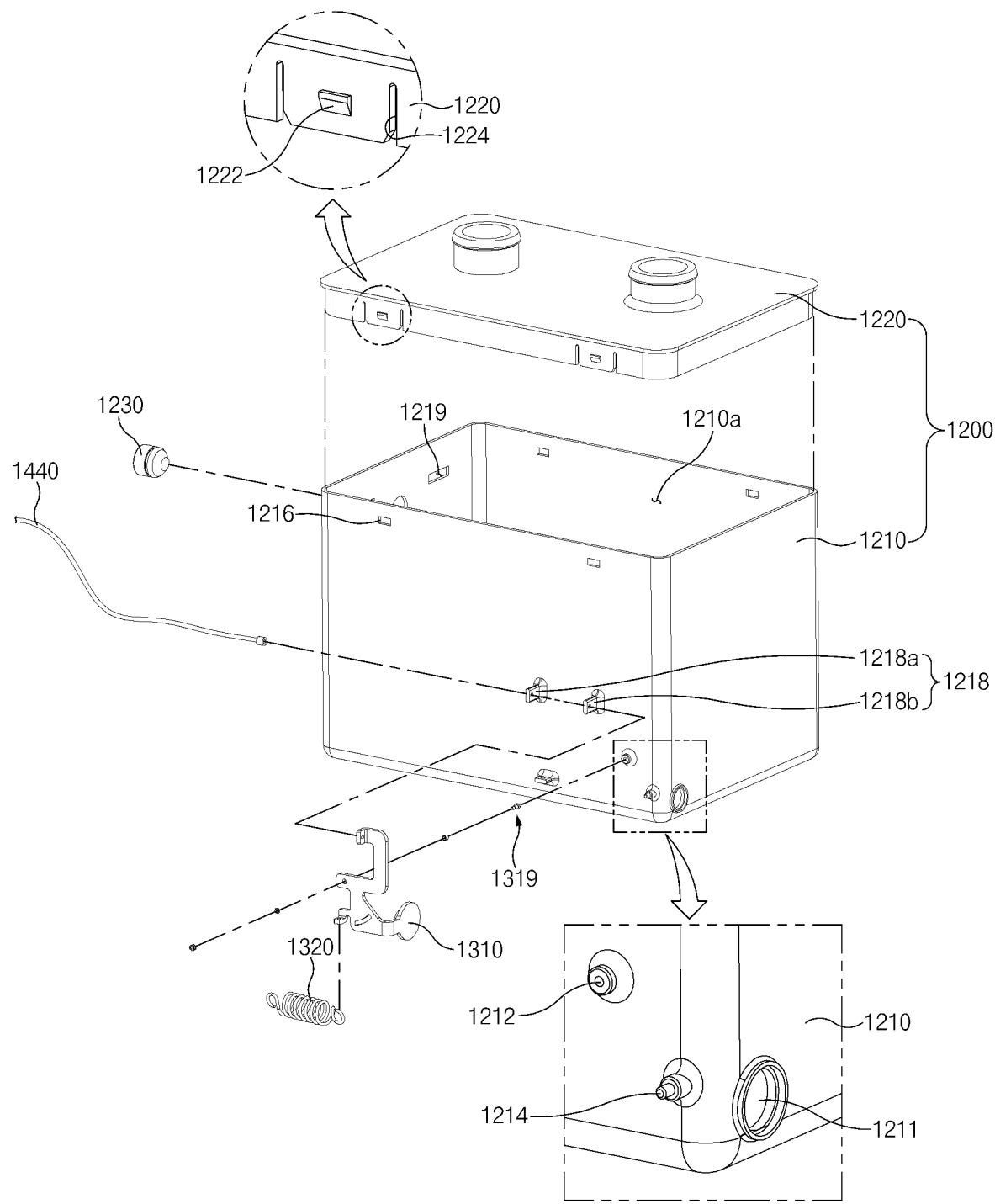
FIG. 14 is a view for explaining a condensate water storage device of the fuel cell system according to the second embodiment of the present disclosure.
Figure 15:
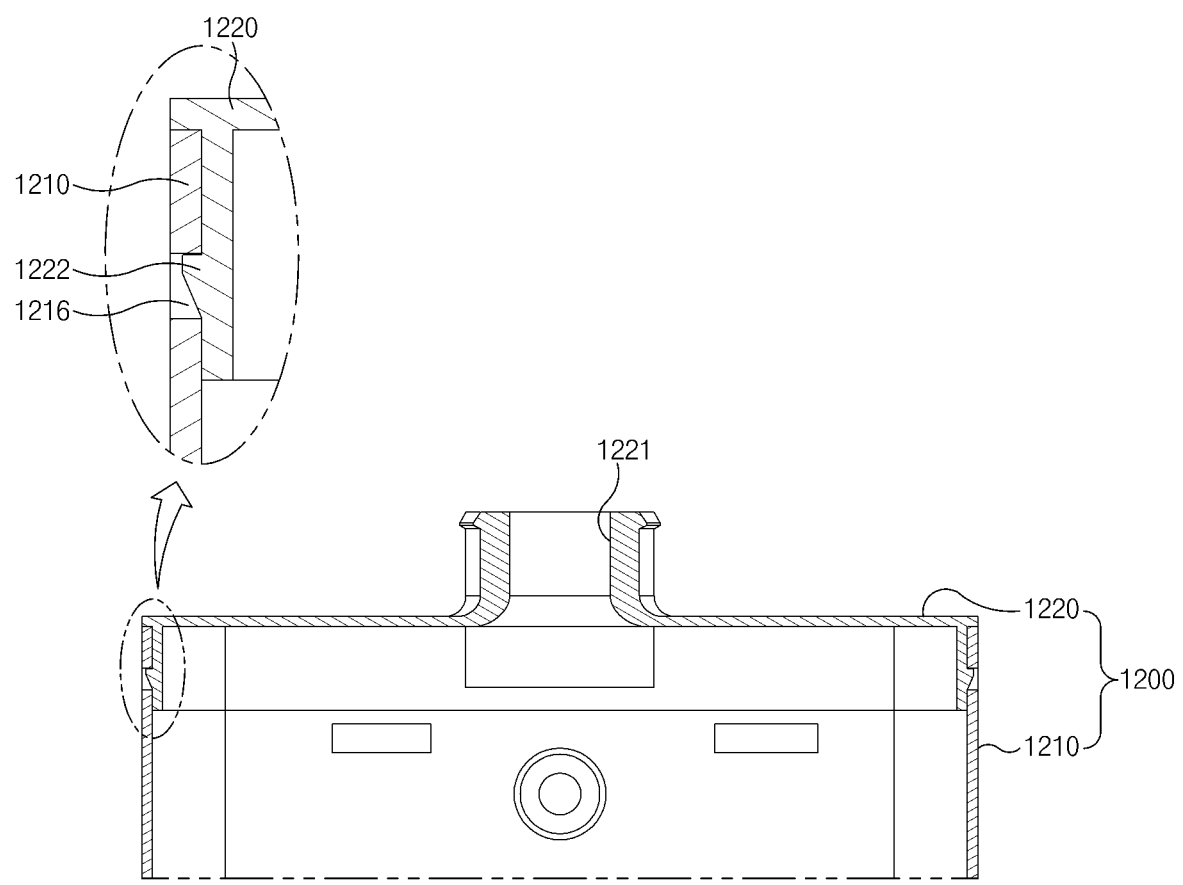
FIG. 15 is a view for explaining a storage container of the fuel cell system according to the second embodiment of the present disclosure.

Referring to FIGS. 13 to 15, the storage container 1200 has the storage space 1210a for storing the condensate water (e.g., the condensate water produced from the fuel cell stack), and the discharge hole 1211 for discharging the condensate water to the outside.

The storage container 1200 may have various structures having the storage space 1210a and the discharge hole 1211. The present disclosure is not restricted or limited by the shape and structure of the storage container 1200.

For example, the storage container 1200 may include a container main body 1210 having the storage space 1210a, and a container cover 1220 configured to cover the storage space 1210a.

The container main body 1210 may be variously changed in shape and structure in accordance with required conditions and design specifications. The present disclosure is not restricted or limited by the shape and structure of the container main body 1210. For example, the container main body 1210 may be provided in the form of a quadrangular box having the storage space 1210a opened at an upper side thereof.

For example, the discharge hole 1211 (e.g., the circular discharge hole) may be provided in a sidewall portion of the container main body 1210, and the condensate water stored in the storage space 1210a may be discharged to the outside of the storage container 1200 through the discharge hole 1211.

The container cover 1220 is disposed at an upper side of the container main body 1210 and serves to cover the storage space 1210a. The container cover 1220 may have an inlet port 1221, and one end of the connection line configured to connect the humidifier 30 (the moist air discharge port) and the storage container 1200 may be connected to the inlet port 1221.

Referring to FIGS. 14 and 15, according to the second exemplary embodiment of the present disclosure, the condensate water storage device 1100 may include locking grooves 1216 provided in the container main body 1210, locking protrusions 1222 provided on the container cover 1220 and configured to be locked to the locking grooves 1216, and cut-out slits 1224 provided in the container cover 1220 and disposed adjacent to the locking protrusions 1222.

The locking protrusion 1222 may have various structures capable of being locked to the locking groove 1216. The present disclosure is not restricted or limited by the structure of the locking protrusion 1222.

For example, when the container cover 1220 is coupled to an upper portion of the container main body 1210, the locking protrusions 1222 may be accommodated in the locking grooves 1216 and locked to inner wall surfaces of the locking grooves 1216.

Since the container cover 1220 and the container main body 1210 are locked to each other by means of the locking grooves 1216 and the locking protrusions 1222 as described above, it is possible to obtain an advantageous effect of stably maintaining the state in which the container cover 1220 is coupled to the container main body 1210.

In addition, one or more cut-out slits 1224 may be provided in the container cover 1220 and disposed adjacent to the locking protrusion 1222.

The cut-out slit 1224 may be made by partially removing (cutting) a part of the container cover 1220. The present disclosure is not restricted or limited by the shape and structure of the cut-out slit 1224.

For example, the cut-out slits 1224 may be provided in an upward/downward direction and disposed at two opposite left and right sides of the locking protrusion 1222 based on the locking protrusion 1222.

According to another example of the second embodiment of the present disclosure, the cut-out slit may be provided in a leftward/rightward direction or other directions based on the locking protrusion. Alternatively, the cut-out slit may have a curved shape such as an 'S' shape or a 'C' shape.

As described above, the cut-out slits 1224 may be provided at the periphery of the locking protrusion 1222, which makes it possible to improve the dynamic properties of the locking protrusion 1222 (the properties that allow the locking protrusion 1222 to freely move) relative to the container cover 1220 and make it easy to couple and separate the locking protrusion 1222 to and from the locking groove 1216.

Figure 16:
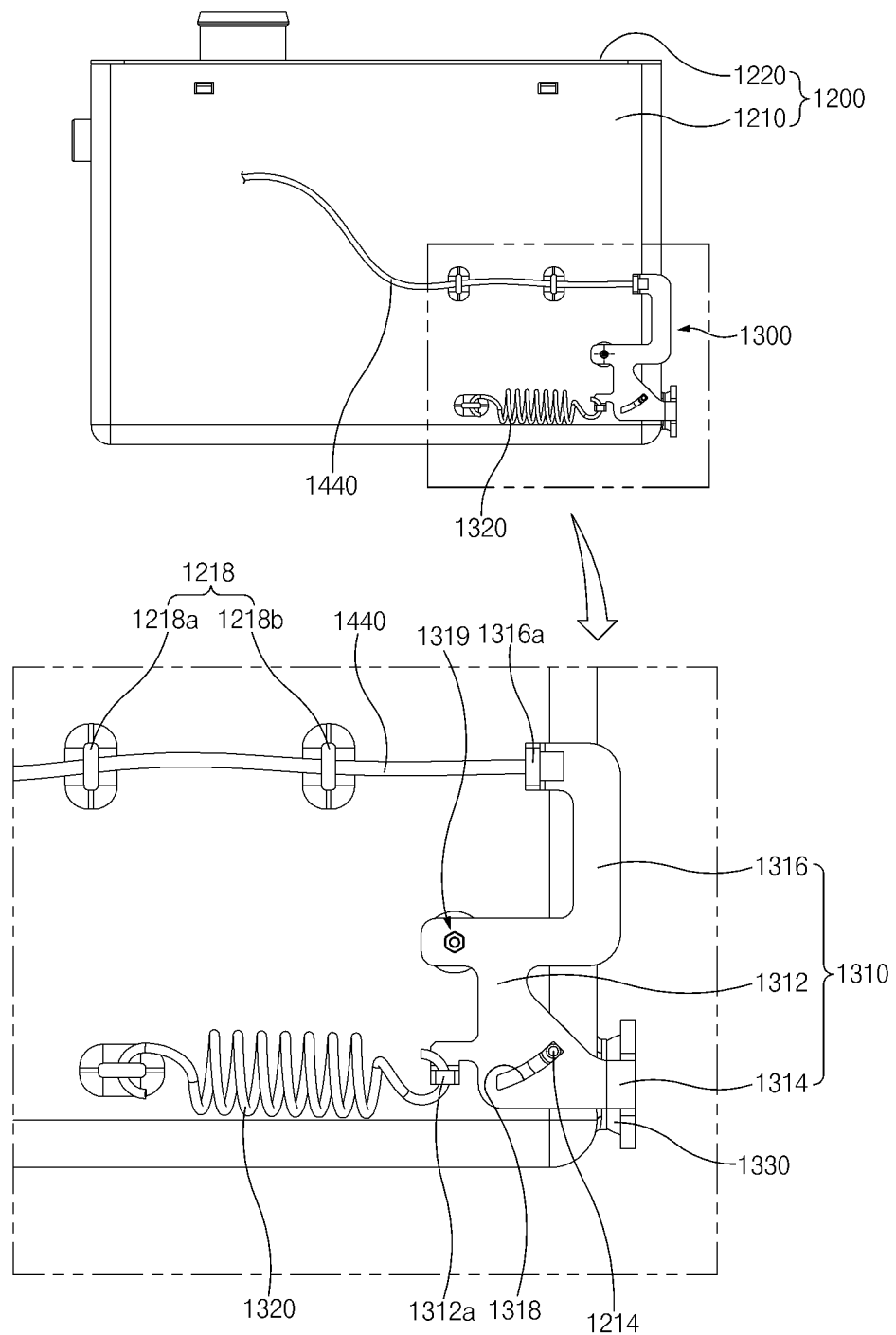
FIG. 16 is a view for explaining a valve unit of the fuel cell system according to the second embodiment of the present disclosure.
Figure 17:
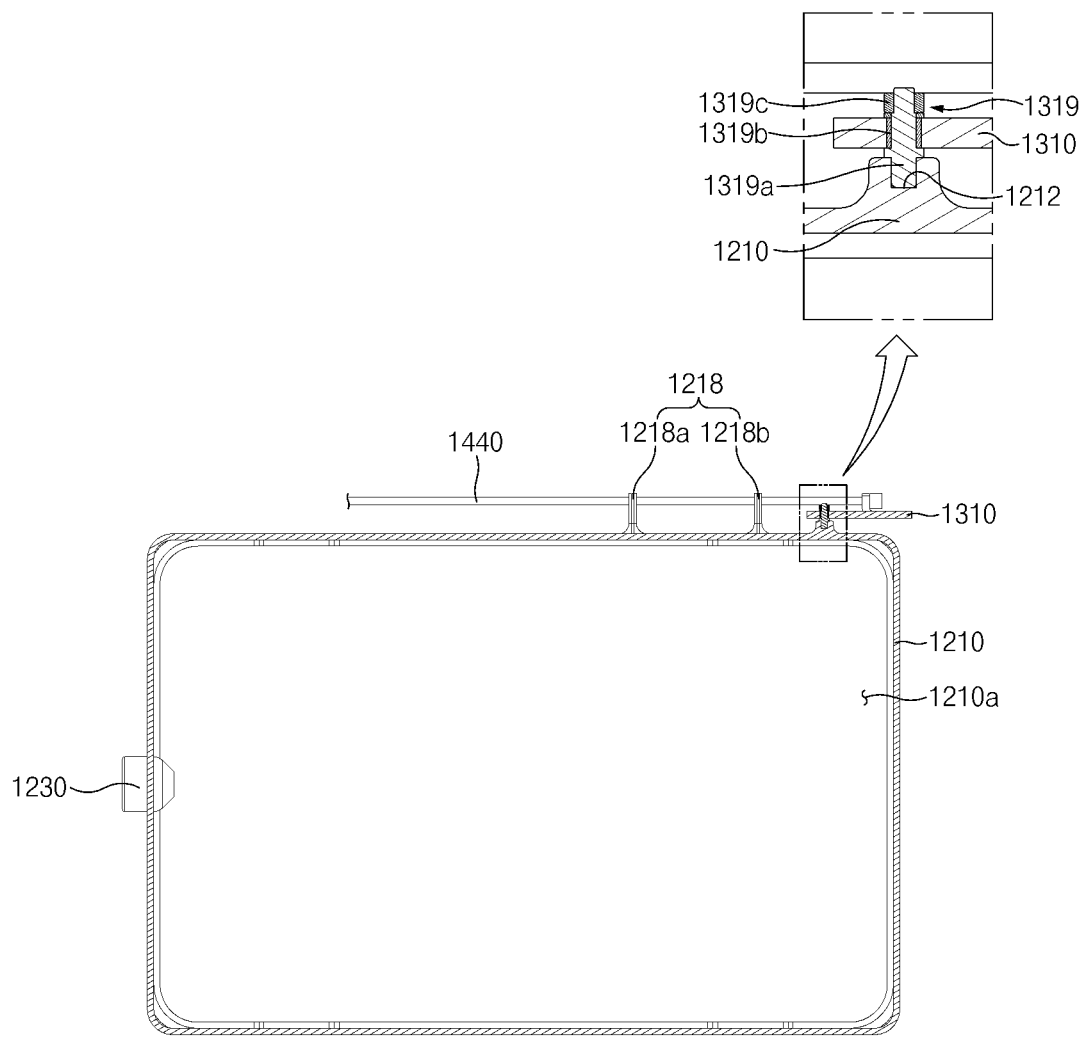
FIGS. 17 to 19 are views for explaining a hinge module of the fuel cell system according to the second embodiment of the present disclosure.
Figure 18:
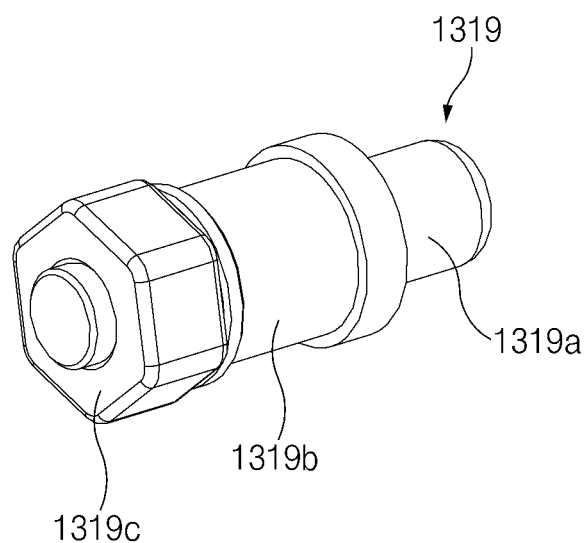
Figure 19:
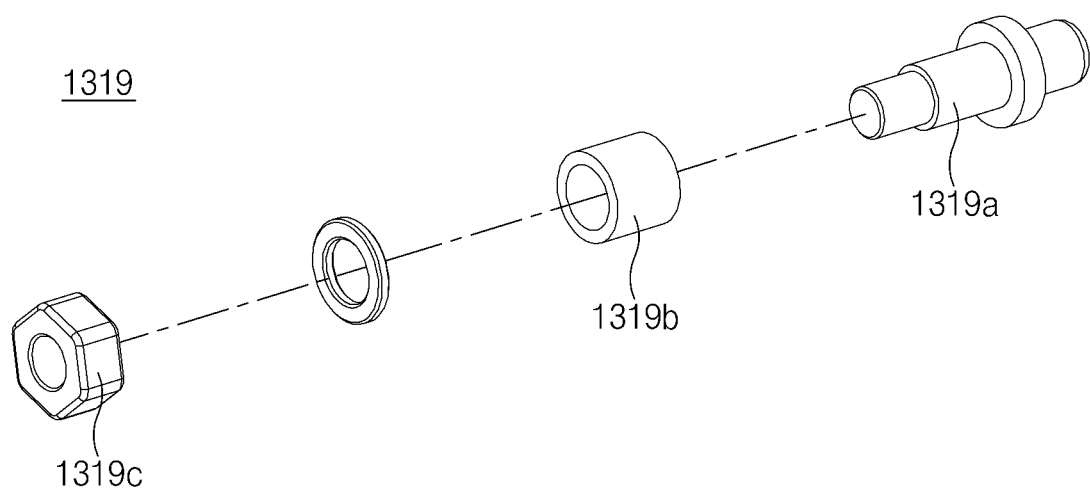
Figure 20:
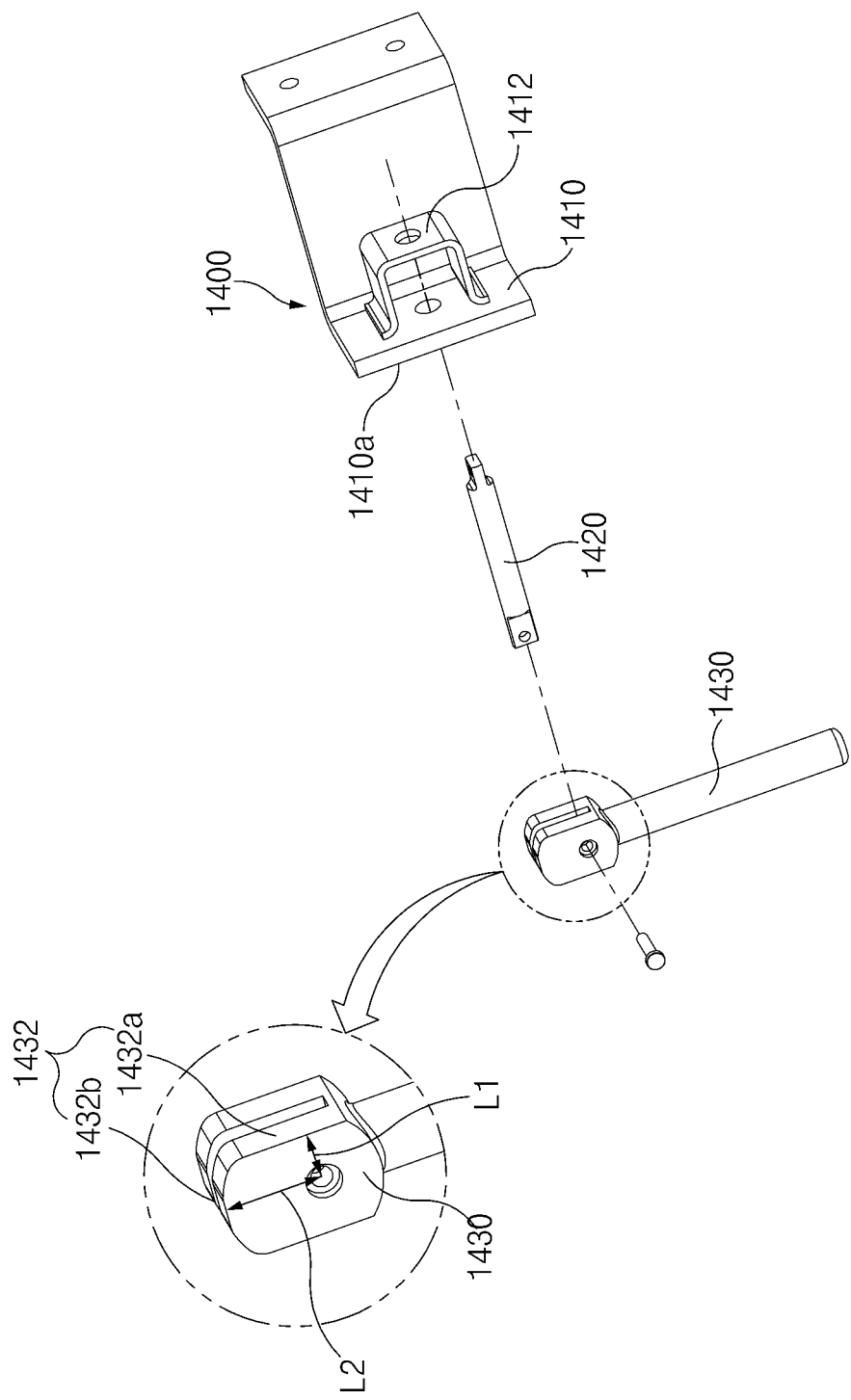
FIGS. 20 to 22 are views for explaining an operating unit of the fuel cell system according to the second embodiment of the present disclosure.
Figure 23:
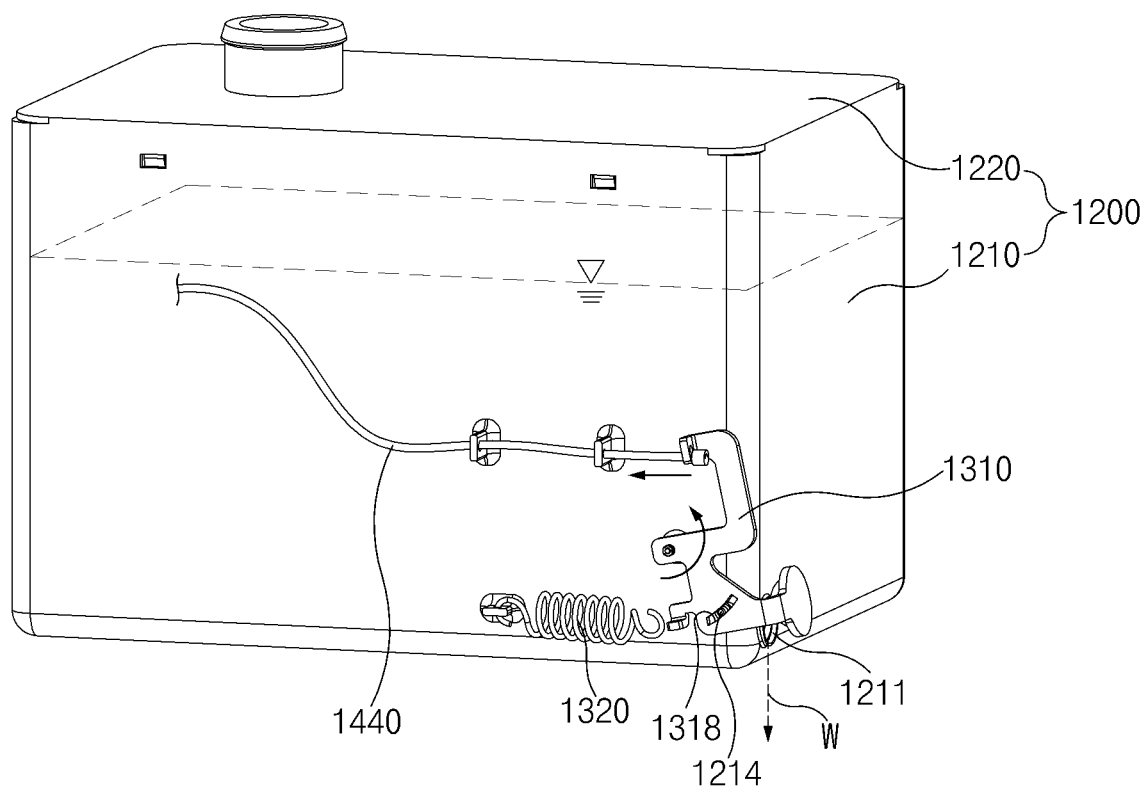
FIG. 23 is a view for explaining an opened state of a discharge hole of the fuel cell system according to the second embodiment of the present disclosure.
Figure 24:
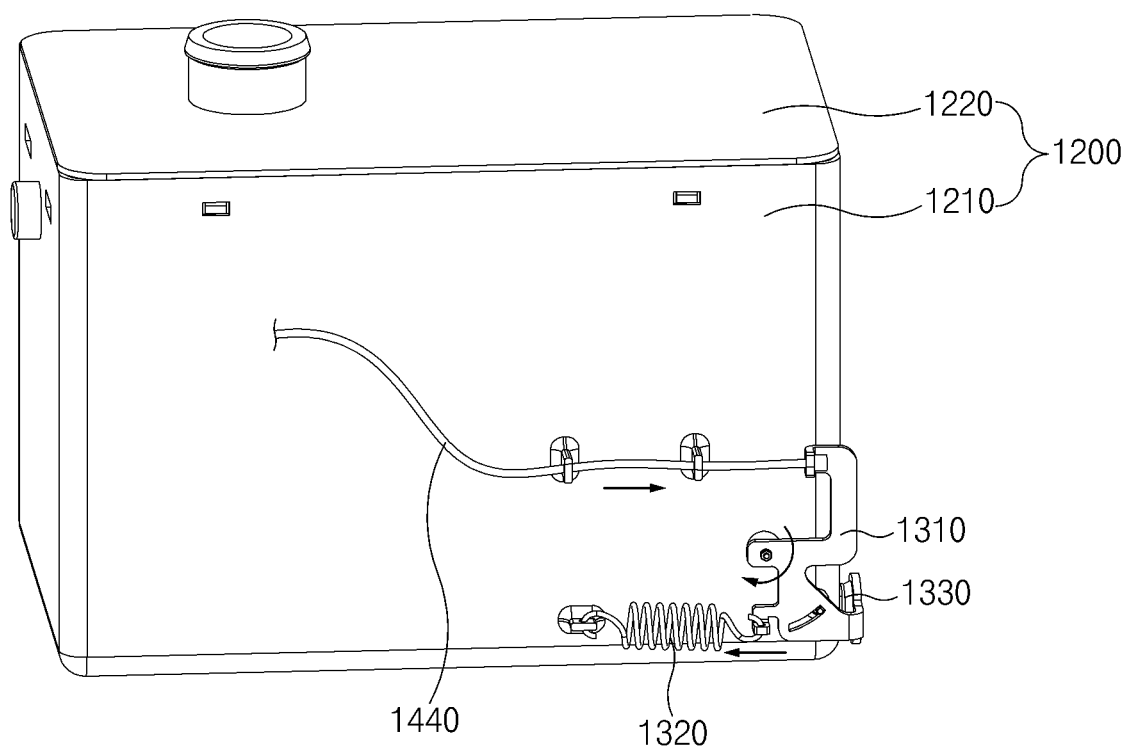
FIG. 24 is a view for explaining a closed state of the discharge hole of the fuel cell system according to the second embodiment of the present disclosure.

Referring to FIGS. 16, 23, and 24, the valve unit 1300 serves to selectively open or close the discharge hole 1211.

The valve unit 1300 may have various structures capable of selectively opening or closing the discharge hole 1211. The present disclosure is not restricted or limited by the structure of the valve unit 1300.

For example, the valve unit 1300 may include: a valve member 1310 configured to be movable from a first position at which the valve member 1310 closes the discharge hole 1211 to a second position at which the valve member 1310 opens the discharge hole 1211; and an elastic member 1320 configured to provide an elastic force to allow the valve member 1310 to move to the first position.

Hereinafter, an example will be described in which the valve unit is disposed outside (on an outer surface of) the storage container 1200.

In this case, the configuration in which the valve member 1310 is positioned at the first position means that the valve member 1310 is positioned to close the discharge hole 1211, and the configuration in which the valve member 1310 is positioned at the second position means that the valve member 1310 is positioned to open the discharge hole 1211.

The valve member 1310 may be configured to move from the first position to the second position in various ways in accordance with required conditions and design specifications.

For example, the valve member 1310 may be configured to rotate from the first position to the second position (or from the second position to the first position).

According to the second exemplary embodiment of the present disclosure, the valve member 1310 may include: a body portion 1312 connected to the storage container 1200 and configured to be rotatable from the first position to the second position; an opening/closing portion 1314 integrally extending from one end of the body portion 1312 and configured to open or close the discharge hole 1211; and a connection portion 1316 integrally extending from the other end of the body portion and connected to the operating unit 1400.

More specifically, the opening/closing portion 1314 may be integrally connected to the body portion 1312 and open or close the discharge hole 1211 while rotating together with the body portion 1312 when the body portion 1312 rotates.

The body portion 1312 may be configured to rotate relative to the storage container 1200 in various ways in accordance with required conditions and design specifications. The present disclosure is not restricted or limited by the structure for rotating the body portion 1312 relative to the storage container 1200.

For example, the condensate water storage device 1100 may include a hinge module 1319 configured to connect the body portion 1312 and the storage container 1200 so that the body portion is rotatable.

The hinge module 1319 may be variously changed in structure in accordance with required conditions and design specifications. The present disclosure is not restricted or limited by the structure of the hinge module 1319.

According to the second exemplary embodiment of the present disclosure, the hinge module 1319 may include: a hinge shaft 1319*a* fixed to the storage container 1200 and configured to support the body portion 1312 so that the body portion 1312 is rotatable; a bushing 1319*b* interposed between the body portion 1312 and the hinge shaft 1319*a*; and a fastening member 1319*c* fastened to the hinge shaft 1319*a* and configured to fasten the body portion to the hinge shaft 1319*a*.

One end of the hinge shaft 1319*a* may be fixed to an outer surface of the container main body 1210. In particular, a press-fit groove 1212 may be provided in the outer surface of the container main body 1210, and one end of the hinge shaft 1319*a* may be press-fitted into the press-fit groove 1212.

Since the press-fit groove 1212, which has a non-penetrating structure instead of a through-hole having a penetrating structure, is provided in the storage container 1200 and one end of the hinge shaft 1319*a* is press-fitted into the press-fit groove 1212 as described above, it is possible to obtain an advantageous effect of basically preventing a leak of condensate water through the connection part (the press-fit groove) to which the hinge shaft 1319*a* is connected.

The bushing 1319*b* may have a hollow cylindrical shape that partially surrounds the hinge shaft 1319*a*. The bushing 1319*b* may be interposed between the body portion and the hinge shaft 1319*a*. Since the bushing 1319*b* is interposed between the body portion and the hinge shaft 1319*a* as described above, it is possible to obtain an advantageous effect of ensuring a smooth rotation of the valve member 1310 (body portion) relative to the container main body 1210 and improving rotational stability of the valve member 1310.

In a state in which the valve member 1310 is assembled with the hinge shaft 1319*a*, the fastening member 1319*c* may be fastened to the other end of the hinge shaft 1319*a* and lock an assembled state of the valve member 1310.

A typical nut may be used as the fastening member 1319*c*. The present disclosure is not restricted or limited by the type and structure of the fastening member 1319*c*.

In particular, a washer (not illustrated) may be disposed between the fastening member 1319*c* and the bushing 1319*b* and serve to ensure a smooth rotation of the bushing 1319*b*.

Referring to FIG. 16, according to the second exemplary embodiment of the present disclosure, the condensate water storage device 1100 may include a guide slot 1318 provided in the valve member, and a guide protrusion 1214 provided on the storage container 1200 and accommodated in the guide slot 1318, the guide protrusion 1214 being movable along the guide slot 1318.

For example, the body portion may have the guide slot 1318 having an approximately arc shape formed along a rotation route along which the body portion rotates relative to the storage container 1200. The guide protrusion 1214 may be provided on the outer surface of the container main body 1210 and move along the guide slot 1318.

Since the guide protrusion 1214 moves along the guide slot 1318 as described above, it is possible to obtain an advantageous effect of minimizing vibration and swaying of the valve member and inhibiting the valve member from deviating from a predetermined movement route when the valve member rotates relative to the storage container 1200.

The elastic member 1320 serves to elastically support the movement (rotation) of the valve member 1310 relative to the storage container 1200.

More specifically, the elastic member 1320 serves to provide an elastic force that allows the valve member 1310 to move to the first position.

Since the elastic member 1320 elastically supports the movement (rotation) of the valve member 1310 relative to the storage container 1200 as described above, the opening/closing portion may more effectively come into close contact with the discharge hole 1211. Therefore, it is possible to obtain an advantageous effect of improving performance in closing the discharge hole 1211 by means of the opening/closing portion.

A typical elastic means capable of elastically supporting the movement of the valve member 1310 relative to the storage container 1200 may be used as the elastic member 1320. The present disclosure is not restricted or limited by the type and structure of the elastic member 1320.

For example, a spring may be used as the elastic member 1320. One end of the elastic member 1320 may be coupled to the outer surface of the container main body 1210, and the other end of the elastic member 1320 may be coupled to the valve member (e.g., a first coupling portion).

According to the second exemplary embodiment of the present disclosure, the condensate water storage device 1100 may include: a first coupling portion 1312*a* protruding from a lateral surface of the body portion 1312 and coupled to the elastic member 1320; and a second coupling portion 1316*a* protruding from a lateral surface of the connection portion 1316 and coupled to the operating unit 1400 (e.g., an operating cable).

For example, the first coupling portion 1312*a* may have a first coupling hole (not illustrated) to which the elastic member 1320 is coupled, and the second coupling portion 1316*a* may have a second coupling hole (not illustrated) to which the operating unit 1400 is coupled.

Since the elastic member 1320 and the operating unit 1400 are respectively coupled to the first and second coupling portions 1312*a* and 1316*a* respectively protruding from the lateral surfaces of the body and connection portions as described above, it is possible to obtain an advantageous effect of minimizing rotational interference between the elastic member 1320 and the operating unit 1400 and ensuring the smooth rotation of the valve member.

According to another example of the second embodiment of the present disclosure, the elastic member may be configured to elastically support the opening/closing portion or other portions instead of the body portion.

According to the second exemplary embodiment of the present disclosure, the condensate water storage device 1100 may include a valve sealing member 1330 interposed between the opening/closing portion 1314 and the discharge hole 1211.

The valve sealing member 1330 serves to seal a gap between the opening/closing portion 1314 and the discharge hole 1211.

The valve sealing member 1330 may have various structures and be made of various materials in accordance with required conditions and design specifications. The present disclosure is not restricted or limited by the structure and material of the valve sealing member 1330.

For example, the valve sealing member 1330 may be made of an elastic material such as rubber, silicone, or urethane.

According to the second exemplary embodiment of the present disclosure, the valve sealing member 1330 may have an approximately dome shape having a diameter corresponding to the discharge hole 1211 and be provided integrally with a bottom surface of the opening/closing portion 1314. For example, the valve sealing member 1330 may be integrated with the valve member 1310 by double injection molding.

According to another example of the second embodiment of the present disclosure, the valve sealing member may be attached to (or assembled with) the opening/closing portion.

The valve sealing member 1330 may seal the gap between the opening/closing portion 1314 and the discharge hole 1211 in a state in which one surface of the valve sealing member 1330 is seated in the discharge hole 1211 (the valve member is moved to the first position). Therefore, it is possible to obtain an advantageous effect of minimizing a leak of the condensate water through the gap between the opening/closing portion 1314 and the discharge hole 1211.

Meanwhile, in the second embodiment of the present disclosure illustrated and described above, the example has been described in which the valve member 1310 rotates from the first position to the second position. However, according to another example of the second embodiment of the present disclosure, the valve member 1310 may be configured to rectilinearly move from the first position to the second position.

Referring to FIGS. 13 and 20 to 22, the operating unit 1400 is connected to the valve unit 1300 and selectively manipulates the operation of the valve unit 1300.

More specifically, the operating unit 1400 is configured such that the user manually manipulates the operating unit 1400 to selectively move the valve member 1310 from the first position to the second position.

The operating unit 1400 may have various structures capable of allowing the user to manually operate the valve unit 1300. The present invention is not restricted or limited by the structure of the operating unit 1400.

For example, the operating unit 1400 may include: a bracket member 1410 fixed to an object; a rectilinearly movable member 1420 rectilinearly movably disposed on the bracket member 1410; an operating lever 1430 rotatably connected to one end of the rectilinearly movable member 1420 and configured to be rotatable relative to the bracket member 1410; and an operating cable 1440 having one end connected to the other end of the rectilinearly movable member 1420 and having the other end connected to the valve member 1310. The rectilinearly movable member 1420 may rectilinearly move relative to the bracket member 1410 while operating in conjunction with the rotation of the operating lever 1430.

The object to which the bracket member 1410 is fixed may be variously changed in accordance with required conditions and design specifications.

For example, the object may be a frame or structure that defines an external appearance of a construction machine. The bracket member 1410 fixed to the object may be exposed to the outside. According to another example of the second embodiment of the present invention, the bracket member may be fixed to the outer surface of the storage container or other position.

The bracket member 1410 may have various structures capable of being fixed to the object. The present invention is not restricted or limited by the structure of the bracket structure.

For example, the bracket member 1410 may have a bent structure and be fixed (attached or coupled) in the form of a cantilevered beam to the object.

The rectilinearly movable member 1420 may have various structures capable of rectilinearly moving relative to the bracket member 1410. The present invention is not restricted or limited by the structure of the rectilinearly movable member 1420.

For example, the rectilinearly movable member 1420 may be provided in the form of a rod having a predetermined length. The rectilinearly movable member 1420 may be disposed to be rectilinearly movable along a passing hole (not illustrated) provided in the bracket member 1410. The operating cable 1440 may be connected to one end of the rectilinearly movable member 1420, and the operating lever 1430 may be rotatably connected to the other end of the rectilinearly movable member 1420.

In particular, the condensate water storage device 1100 may include a guide bracket 1412 connected to the bracket member 1410 and configured to support the rectilinearly movable member 1420 on the bracket member 1410 so that the rectilinearly movable member 1420 is rectilinearly movable.

For example, the guide bracket 1412 may have an approximately 'U' cross-sectional shape. The rectilinearly movable member 1420 may be disposed to penetrate the guide bracket 1412.

As described above, the rectilinear movement of the rectilinearly movable member 1420 is supported by the dual support structure including the bracket member 1410 and the guide bracket 1412. Therefore, it is possible to obtain an advantageous effect of stably maintaining the arrangement state of the rectilinearly movable member 1420 and inhibiting the rectilinearly movable member 1420 from deviating from a predetermined movement route.

The operating lever 1430 may rotate relative to the bracket member 1410. The operating lever 1430 is rotatably connected to one end of the rectilinearly movable member 1420.

The connection structure between the operating lever 1430 and the rectilinearly movable member 1420 may be variously changed in accordance with required conditions and design specifications.

For example, the operating lever 1430 may have an accommodation portion (not illustrated) that accommodates the other end of the rectilinearly movable member 1420. The rectilinearly movable member 1420 and the operating lever 1430 may be rotatably connected by means of a connection pin (not illustrated) in a state in which the other end of the rectilinearly movable member 1420 is accommodated in the accommodation portion.

The operating cable 1440 is provided to allow the valve member to operate in conjunction with the rotation of the operating lever 1430.

More specifically, one end of the operating cable 1440 may be connected to the other end of the rectilinearly movable member 1420, and the other end of the operating cable 1440 may be connected to the valve member. When the rectilinearly movable member 1420 is rectilinearly moved by the rotation of the operating lever 1430, the operating cable 1440 connected to the rectilinearly movable member 1420 is pulled, such that the valve member may operate (e.g., rotate to the second position).

A cable made of metal or synthetic resin may be used as the operating cable 1440. The present disclosure is not restricted or limited by the material and type of the operating cable 1440.

In particular, the condensate water storage device 1100 may include a support part 1218 configured to support the operating cable 1440 on the storage container 1200.

The support part 1218 serves to inhibit a tangle (twist) and separation of the operating cable 1440 and stably maintain an arrangement state of the operating cable 1440.

The support part 1218 may have various structures capable of supporting the operating cable 1440. The present disclosure is not restricted or limited by the structure of the support part 1218.

For example, the support part 1218 may include a first support protrusion 1218a disposed on the storage container 1200 and configured to support the operating cable 1440, and a second support protrusion 1218b disposed on the storage container 1200, spaced apart from the first support protrusion 1218a, and configured to support the operating cable 1440. For example, the first support protrusion 1218a may have a first support hole (not illustrated) that accommodates the operating cable 1440, and the second support protrusion 1218b may have a second support hole that accommodates the operating cable 1440.

According to another example of the second embodiment of the present disclosure, the support part may include only a single support protrusion or three or more support protrusions.

The rectilinear movement of the rectilinearly movable member 1420 performed by the rotation of the operating lever 1430 may be implemented in various ways in accordance with required conditions and design specifications.

According to the second exemplary embodiment of the present invention, the condensate water storage device 1100 may include a cam contact portion 1410a formed on the bracket member 1410, and a cam profile 1432 provided on the operating lever 1430 so as to be in contact with the cam contact portion 1410a. When the cam profile 1432 is rotated relative to the cam contact portion 1410a by the rotation of the operating lever 1430, the rectilinearly movable member 1420 may rectilinearly move relative to the bracket member 1410.

For example, the cam contact portion 1410a may be a flat cam contact surface formed on one end of the bracket member 1410. According to another example of the second embodiment of the present invention, the cam contact portion may be provided in the form of a protrusion.

The cam profile 1432 may include a first cam portion 1432a spaced apart from a rotation center of the operating lever 1430 by a first distance L1 relative to the rectilinearly movable member 1420, and a second cam portion 1432b spaced apart from the rotation center of the operating lever 1430 by a second distance L2 relative to the rectilinearly movable member 1420. The second distance L2 is longer than the first distance L1 (L2>L1). The second cam portion 1432b is continuously connected to two opposite left and right sides of the first cam portion 1432a. Hereinafter, an example will be described in which the first cam portion 1432a is in the form of a flat surface, and the second cam portion 1432b is in the form of a curved surface.

Figure 21:
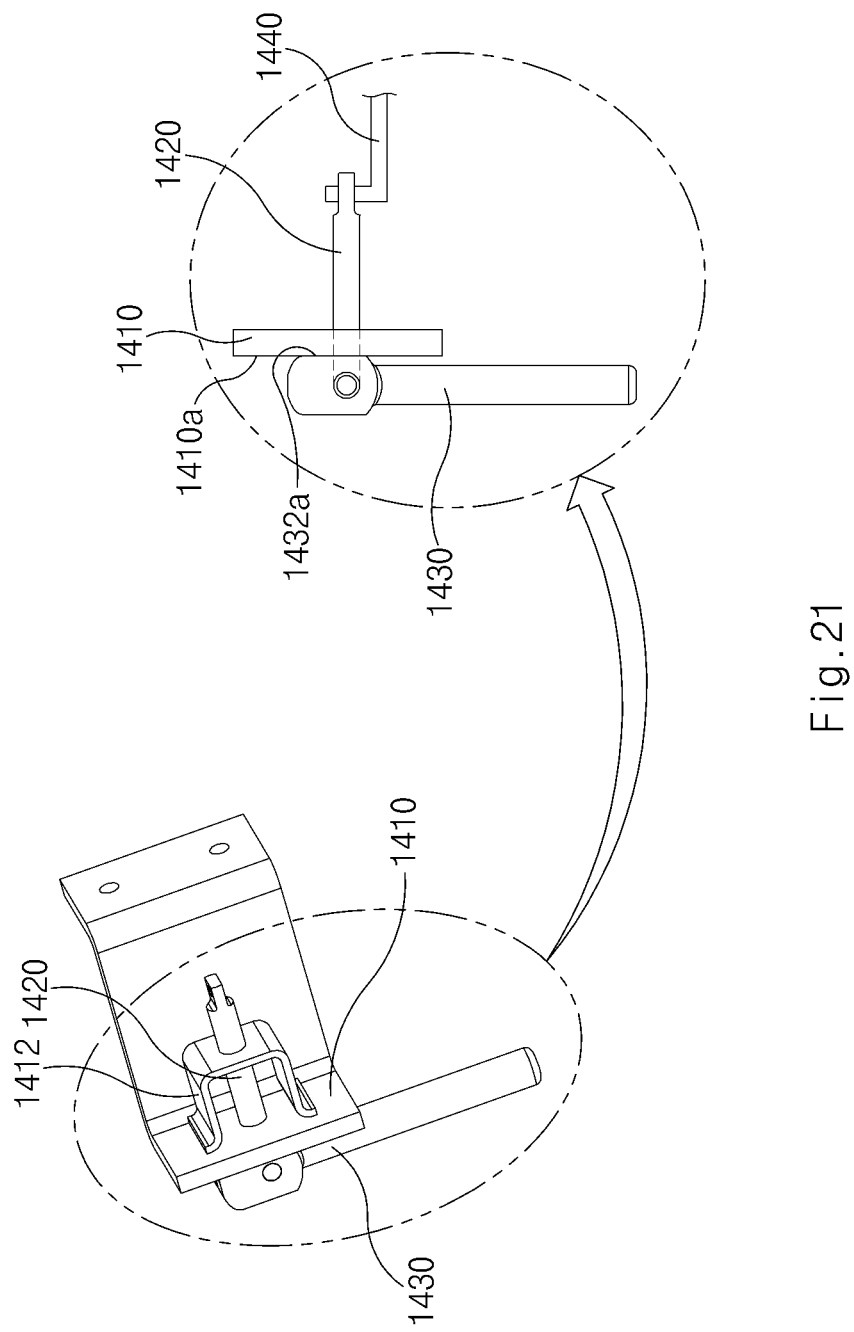
Figure 22:
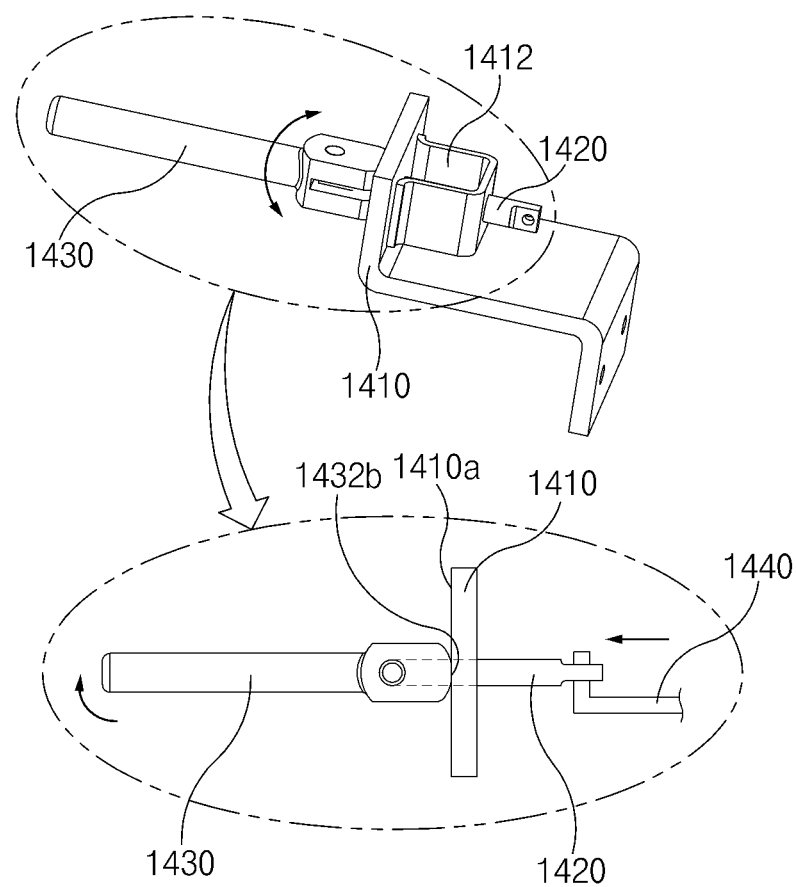

A state in which the operating cable 1440 is not pulled may be maintained when the first cam portion 1432a is in contact with the cam contact portion 1410a (see FIG. 21). In contrast, in the state in which the second cam portion 1432b is in contact with the cam contact portion 1410a, the rectilinearly movable member 1420 is moved (in a left direction based on FIG. 21) by the operating lever 1430, such that the operating cable 1440 may be pulled (in the left direction based on FIG. 21) by the rectilinearly movable member 1420 (see FIG. 22).

In the second embodiment of the present invention illustrated and described above, the example has been described in which the rotation of the operating lever is converted into the rectilinear movement of the rectilinearly movable member 1420 by the cam profile 1432 and the cam contact portion 1410a. However, according to another example of the second embodiment of the present invention, the rotation of the operating lever may be converted into the rectilinear movement of the rectilinearly movable member by using a combination of a rack and a pinion.

Meanwhile, according to another example of the second exemplary embodiment of the present disclosure, the valve unit may be disposed inside the storage container. However, in the case in which the valve unit is disposed inside the storage container, it is difficult to ensure a sufficient storage space for storing the condensate water and it is necessary to inevitably provide a hole in the storage container (the hole through which the operating cable passes) in order to connect the valve unit and the operating unit. For this reason, there is a problem in that there is a likelihood of a leak of condensate water and a sealing member needs to be additionally provided.

In contrast, in the second embodiment of the present disclosure, the valve unit 1300 may be disposed outside the storage container 1200. Therefore, it is possible to sufficiently ensure the storage space 1210*a* of the storage container 1200, and it is not necessary to provide the storage container 1200 with the hole used to connect the valve unit 1300 and the operating unit 1400. As a result, it is possible to obtain an advantageous effect of preventing a leak of the condensate water and simplifying the structure.

Meanwhile, FIG. 23 is a view for explaining an opened state of the discharge hole of the fuel cell system according to the second embodiment of the present disclosure, and FIG. 24 is a view for explaining a closed state of the discharge hole of the fuel cell system according to the second embodiment of the present disclosure.

Referring to FIG. 23, when the second cam portion 1432*b* comes into contact with the cam contact portion 1410*a* as the operating lever 1430 rotates, the rectilinearly movable member 1420 rectilinearly moves in the direction in which the operating cable 1440 is pulled. Therefore, the operating cable 1440 may be pulled by the rectilinearly movable member 1420. When the operating cable 1440 is pulled, the valve member 1310 may be rotated counterclockwise (based on FIG. 23), such that the valve member 1310 may be disposed at the position (second position) at which the discharge hole 1211 is opened. In this case, the elastic member 1320 may be stretched while accumulating the elastic force. In the state in which the discharge hole 1211 is opened, condensate water W accommodated in the storage container 1200 may be discharged to the outside of the storage container 1200 through the discharge hole 1211.

In contrast, referring to FIG. 24, when the first cam portion 1432*a* comes into contact with the cam contact portion 1410*a* as the operating lever 1430 rotates in a reverse direction (e.g., counterclockwise) by 90 degrees, the rectilinearly movable member 1420 rectilinearly moves in a reverse direction (a direction in which the tension of the operating cable is released), such that the operating cable 1440 may be loosely released. When tension of the operating cable 1440 is released (the connection cable 1400 is loosened), the valve member 1310 may be rotated clockwise (based on FIG. 13) by the elastic force of the elastic member 1320, such that the valve member 1310 may be disposed at the position (first position) at which the discharge hole 1211 is closed. Further, the state in which the valve member 1310 closes the discharge hole 1211 may be elastically supported by the elastic force of the elastic member 1320.

According to the second exemplary embodiment of the present disclosure, the condensate water storage device 1100 may include overflow holes 1219 provided in the container main body 1210, and the condensate water may be discharged to the outside through the overflow holes 1219 when a water level of the condensate water exceeds a preset reference water level.

In addition, according to the second exemplary embodiment of the present disclosure, the condensate water storage device 1100 may include a level sensor 1230 disposed in the storage container 1200 and configured to detect the water level of the condensate water.

For example, the level sensor 1230 may be disposed on the sidewall portion of the container main body 1210. The level sensor 1230 may collect the water levels of the condensate water stored in the container main body 1210.

According to the second exemplary embodiment of the present disclosure, the condensate water storage device 1100 may include an alarm generation unit 1500 configured to generate an alarm signal when the detection result of the level sensor 1230 indicates that the water level of the condensate water exceeds the preset reference water level.

In this case, the alarm signal may include at least one of an auditory alarm signal made by a typical sound means and a visual alarm signal made by a typical warning lamp. In addition, other various alarm signals may be used to inform a user (operator) of a situation in which the water level of the condensate water is excessively increased.

According to the embodiment of the present disclosure described above, it is possible to obtain an advantageous effect of selectively adjusting whether to discharge the condensate water.

In particular, according to the embodiment of the present disclosure, it is possible to obtain an advantageous effect of selectively discharging the condensate water, which is produced from the fuel cell stack, to the predetermined particular location.

In addition, according to the embodiment of the present disclosure, it is possible to obtain an advantageous effect of reducing the risks of contamination and accident caused by the discharge of condensate water.

In addition, according to the embodiment of the present disclosure, it is possible to obtain an advantageous effect of improving safety and reliability and creating a comfortable working environment.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:
1. A condensate water storage device comprising:
a storage container defining a storage space configured to store condensate water, and comprising a discharge hole through which the condensate water is discharged to the outside;
a valve member configured to be movable from a first position at which the valve member closes the discharge hole to a second position at which the valve member opens the discharge hole;
a connection cable connected to the valve member;
an elastic member configured to provide an elastic force to allow the valve member to move to the first position; and a winding unit connected to the connection cable and configured to selectively wind the connection cable to move the valve member from the first position to the second position.

2. The condensate water storage device of claim 1, wherein the valve member comprises:
a body portion connected to the storage container and configured to be rotatable from the first position to the second position;
an opening/closing portion extending from a first end of the body portion and configured to open or close the discharge hole; and
a connection portion extending from a second end of the body portion and connected to the connection cable.

3. The condensate water storage device of claim 2, comprising:
a hinge module configured to connect the body portion to the storage container so that the body portion is rotatable.

4. The condensate water storage device of claim 3, wherein the hinge module comprises:
a hinge shaft fixed to the storage container and configured to support the body portion so that the body portion is rotatable;
a bushing interposed between the body portion and the hinge shaft; and
a fastening member fastened to the hinge shaft and configured to lock the body portion to the hinge shaft.

5. The condensate water storage device of claim 2, comprising:
a valve sealing member interposed between the opening/closing portion and the discharge hole.

6. The condensate water storage device of claim 2, comprising:
a first coupling portion disposed on the body portion and coupled to the elastic member; and
a second coupling portion disposed on the connection portion and coupled to the connection cable.

7. The condensate water storage device of claim 1, comprising:
a guide slot disposed in the valve member; and
a guide protrusion disposed on the storage container, accommodated in the guide slot, and configured to be movable along the guide slot.

8. The condensate water storage device of claim 1, wherein the winding unit comprises:
a housing mounted on the storage container and defining an opening portion through which the connection cable enters and exits the housing;
a cable drum rotatably disposed in the housing and configured to wind the connection cable;
a driving part disposed in the housing and configured to provide driving power for rotating the cable drum; and
a power transmission member configured to transmit the driving power of the driving part to the cable drum,
wherein when the connection cable is wound around the cable drum by a rotation of the cable drum, the connection cable is pulled, and the valve member moves to the second position.

9. The condensate water storage device of claim 8, wherein the cable drum comprises:
a drum body rotatably disposed in the housing and configured to wind the connection cable; and
a flange portion disposed at an end of the drum body and having a larger cross-sectional area than the drum body.

10. The condensate water storage device of claim 8, comprising:

a bearing member disposed in the housing and configured to support the cable drum so that the cable drum is rotatable.

11. The condensate water storage device of claim 1, comprising:
a support part configured to support the connection cable on the storage container.

12. The condensate water storage device of claim 11, wherein the support part comprises:
a first support protrusion disposed on the storage container and configured to support the connection cable; and
a second support protrusion disposed on the storage container, spaced apart from the first support protrusion, and configured to support the connection cable.

13. The condensate water storage device of claim 1, wherein the storage container comprises:
a container main body defining the storage space; and
a container cover configured to cover the storage space.

14. The condensate water storage device of claim 13, comprising:
an overflow hole disposed in the container main body,
wherein the condensate water is discharged to the outside through the overflow hole when a water level of the condensate water exceeds a reference water level.

15. The condensate water storage device of claim 13, comprising:
a locking groove disposed in the container main body;
a locking protrusion disposed on the container cover and configured to be locked to the locking groove; and
a cut-out slit disposed in the container cover adjacent to the locking protrusion.

16. The condensate water storage device of claim 1, comprising:
a level sensor disposed in the storage container and configured to measure a water level of the condensate water.

17. The condensate water storage device of claim 16, comprising:
an alarm generation unit configured to generate an alarm signal when a detection result of the level sensor indicates that the water level of the condensate water exceeds a reference water level.

18. The condensate water storage device of claim 17, comprising:
a gradient sensor configured to detect a gradient of the storage container with respect to a ground surface,
wherein the alarm generation unit is configured to generate the alarm signal when the detection result of the gradient sensor indicates that the gradient of the storage container deviates from a reference gradient.

19. A fuel cell system comprising:
a fuel cell stack;
a storage container defining a storage space configured to store condensate water produced from the fuel cell stack, and comprising a discharge hole through which the condensate water is discharged to the outside;
a valve member configured to be movable from a first position at which the valve member closes the discharge hole to a second position at which the valve member opens the discharge hole;
a connection cable connected to the valve member;
an elastic member configured to provide an elastic force to allow the valve member to move to the first position; and a winding unit connected to the connection cable and configured to selectively wind the connection cable to move the valve member from the first position to the second position.

20. A condensate water storage device comprising:
a storage container defining a storage space configured to store condensate water, and comprising a discharge hole through which the condensate water is discharged to the outside;
a valve unit configured to selectively open and close the discharge hole;
a connection cable connected to the valve unit;
a winding unit connected to the connection cable and configured to selectively wind the connection cable and manipulate an operation of the valve unit; and
a support part configured to support the connection cable on the storage container, the support part including a first support protrusion disposed on the storage container and configured to support the connection cable and a second support protrusion disposed on the storage container, spaced apart from the first support protrusion, and configured to support the connection cable.

* * * * *